(12) United States Patent
Weising et al.

(10) Patent No.: US 8,537,113 B2
(45) Date of Patent: Sep. 17, 2013

(54) CALIBRATION OF PORTABLE DEVICES IN A SHARED VIRTUAL SPACE

(75) Inventors: George Weising, Culver City, CA (US); Thomas Miller, Los Angeles, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 314 days.

(21) Appl. No.: 12/973,827

(22) Filed: Dec. 20, 2010

(65) Prior Publication Data

US 2011/0216002 A1 Sep. 8, 2011

Related U.S. Application Data

(60) Provisional application No. 61/311,251, filed on Mar. 5, 2010, provisional application No. 61/323,762, filed on Apr. 13, 2010.

(51) Int. Cl.
*G09G 5/08* (2006.01)

(52) U.S. Cl.
USPC ............. 345/158; 463/6; 463/37; 715/810; 715/856

(58) Field of Classification Search
USPC ...... 345/158; 436/1–8, 30–42; 715/810–856
See application file for complete search history.

(56) References Cited

U.S. PATENT DOCUMENTS

| 6,859,144 | B2 | 2/2005 | Newman et al. | |
| 7,427,996 | B2 * | 9/2008 | Yonezawa et al. | 345/629 |
| 7,843,429 | B2 * | 11/2010 | Pryor | 345/158 |
| 8,253,649 | B2 * | 8/2012 | Imai et al. | 345/1.3 |
| 2003/0156144 | A1 * | 8/2003 | Morita | 345/848 |
| 2006/0033713 | A1 * | 2/2006 | Pryor | 345/158 |
| 2006/0112334 | A1 | 5/2006 | Endrikhovski et al. | |
| 2006/0223635 | A1 * | 10/2006 | Rosenberg | 463/37 |

(Continued)

FOREIGN PATENT DOCUMENTS

| WO | 2004/012141 | 2/2004 |
| WO | 2008/103988 | 8/2008 |

OTHER PUBLICATIONS

Tobii and Lenovo show off prototype eye-controlled laptop, we go eyes-on; http://www.engadget.com/2011/03/01/tobii-and-lenovo-show-off-prototype-eye-controlled-laptop-we-go/.
Guestrin et al.; "General Theory of Remote Gazw Estimation Using the Pupil Center and Corneal Reflections"; IEEE Transactions on Biomedical Engineering, vol. 53, No. 6, Jun. 2006.

(Continued)

*Primary Examiner* — Quan-Zhen Wang
*Assistant Examiner* — Vinh Lam
(74) *Attorney, Agent, or Firm* — Martine Penilla Group, LLP

(57) ABSTRACT

Methods, systems, and computer programs for generating an interactive space viewable through at least a first and a second device are presented. The method includes an operation for detecting from the first device a location of the second device or vice versa. Further, synchronization information data is exchanged between the first and the second device to identify a reference point in a three-dimensional (3D) space relative to the physical location of the devices in the 3D space. The devices establish the physical location in the 3D space of the other device when setting the reference point. The method further includes an operation for generating views of an interactive scene in the displays of the first and second devices. The interactive scene is tied to the reference point and includes virtual objects. The view in the display shows the interactive scene as observed from the current location of the corresponding device. Moving the device in the 3D space causes the view to change according to the perspective from the current location.

20 Claims, 20 Drawing Sheets

(56) References Cited

U.S. PATENT DOCUMENTS

| | | | |
|---|---|---|---|
| 2006/0258420 A1 | 11/2006 | Mullen | 463/1 |
| 2007/0190494 A1* | 8/2007 | Rosenberg | 434/11 |
| 2007/0265089 A1 | 11/2007 | Robarts et al. | 463/42 |
| 2008/0111833 A1 | 5/2008 | Thorn et al. | |
| 2008/0122796 A1* | 5/2008 | Jobs et al. | 345/173 |
| 2008/0228422 A1 | 9/2008 | Satoh | |
| 2008/0261693 A1 | 10/2008 | Zalewski | 463/31 |
| 2009/0221374 A1* | 9/2009 | Yen et al. | 463/42 |
| 2009/0262074 A1* | 10/2009 | Nasiri et al. | 345/158 |
| 2009/0282102 A1* | 11/2009 | Geurts et al. | 709/204 |
| 2009/0303204 A1* | 12/2009 | Nasiri et al. | 345/184 |
| 2010/0020102 A1* | 1/2010 | Vaananen et al. | 345/659 |
| 2011/0195763 A1* | 8/2011 | Kang et al. | 463/6 |
| 2011/0298829 A1 | 12/2011 | Stafford et al. | |

OTHER PUBLICATIONS

Perez et al.; "A Precise Eye-Gaze Detection and Tracking System"; WSCG '2003, Feb. 3-7, 2003 Plezn, Czech Republic.

Magee et al.; "EyeKeys: A Real-time Vision Interface Based on Gaze Detection form a Low-grade Video Camera"; Computer Science Department, Boston University, Boston MA.

Deodhar et al.; "Eye Catchers: A System for Eye Gaze Detection Using the TI C6416 DSP"; Advanced DSP Laboratory, May 7, 2010.

Senju et al.; "Is anyone looking at me? Direct gaze detection in children with and without autism"; Brain and Cognition 67 (2008) 127-139.

Kaminski et al.; "Head Orientation and Gaze Detection From a Single Image"; 2006.

\* cited by examiner

CALIBRATION OF PORTABLE DEVICES IN A SHARED VIRTUAL SPACE

CLAIM OF PRIORITY

This application claims priority from U.S. Provisional Patent Application No. 61/311,251, filed Mar. 5, 2010, and entitled "MAINTAINING MULTIPLE VIEWS ON A SHARED STABLE VIRTUAL SPACE"; and U.S. Provisional Patent Application No. 61/323,762, filed Apr. 13, 2010, and entitled "CALIBRATION OF PORTABLE DEVICES IN A SHARED VIRTUAL SPACE", all of which are incorporated herein by reference.

CROSS-REFERENCE TO RELATED APPLICATIONS

This application is related to U.S. application Ser. No. 12/647,291 filed Dec. 24, 2009, and entitled "WIRELESS DEVICE PAIRING METHODS"; U.S. application Ser. No. 12/647,296 filed Dec. 24, 2009, and entitled "WIRELESS DEVICE PAIRING AND GROUPING METHODS"; U.S. application Ser. No. 12/647,299 filed Dec. 24, 2009, and entitled "WIRELESS DEVICE MULTIMEDIA FEED SWITCHING"; and U.S. Provisional Application 61/319,021, filed Mar. 30, 2010, and entitled "METHOD FOR AN AUGMENTED REALITY CHARACTER TO MAINTAIN AND EXHIBIT AWARENESS OF AN OBSERVER", which are incorporated herein by reference.

BACKGROUND

1. Field of the Invention

The present invention relates to methods, devices, and computer programs for controlling a view of a virtual scene with a portable device, and more particularly, methods, devices, and computer programs for enabling multiplayer interaction in a virtual or augmented reality.

2. Description of the Related Art

Virtual reality (VR) is a computer-simulated environment, whether that environment is a simulation of the real world or an imaginary world, where users can interact with a virtual environment or a virtual artifact either through the use of standard input devices or specialized multidirectional input devices. The simulated environment can be similar to the real world, for example, simulations for pilot or combat training, or it can differ significantly from reality, as in VR games. Virtual Reality is often used to describe a wide variety of applications, commonly associated with its immersive, highly visual, three-dimensional (3D) environments. The development of Computer Aided Design (CAD) software, graphics hardware acceleration, head-mounted displays, database gloves, and miniaturization have helped popularize the notion.

Augmented Reality (AR) provides a live view of a physical real-world environment whose elements are merged with (or augmented by) virtual computer-generated imagery to create a mixed reality. The augmentation is conventionally in real-time and in semantic context with environmental elements, such as sports scores on television during a match. With the help of advanced AR technology (e.g. adding computer vision and object recognition) the information about the surrounding real world of the user becomes interactive and digitally usable.

The term Augmented Virtuality (AV) is also used in the virtual reality world and is similar to AR. Augmented Virtuality also refers to the merging of real world objects into virtual worlds. As an intermediate case in the Virtuality Continuum, AV refers to predominantly virtual spaces, where physical elements, e.g. physical objects or people, are dynamically integrated into, and can interact with the virtual world in real-time. The term VR is used in this application as a generic term that also encompasses AR and AV, unless otherwise specified.

VR games typically required a large amount of computer resources. Implementation in handheld devices of VR games is rare and the existing games are rather simplistic with rudimentary VR effects. Additionally, multiplayer AR games allow for the interaction of players in a virtual world, but the interactions are limited to objects manipulated by the player in the virtual world (e.g., cars, rackets, balls, etc.) The virtual world is computer generated and independent of the location of the players and the portable devices. The relative location of the players with respect to each other and with respect to their surroundings is not taken into account when creating a "realistic" virtual reality experience.

It is in this context that embodiments of the invention arise.

SUMMARY

Embodiments of the present invention provide methods, systems, and computer programs for generating an interactive space viewable through at least a first and a second device are presented. It should be appreciated that the present invention can be implemented in numerous ways, such as a process, an apparatus, a system, a device or a method on a computer readable medium. Several inventive embodiments of the present invention are described below.

In one embodiment, a method includes an operation for detecting from the first device a location of the second device or vice versa. Further, synchronization information data is exchanged between the first and the second devices to identify a reference point in a three-dimensional (3D) space relative to the physical location of the devices in the 3D space. The devices establish the physical location in the 3D space of the other device when setting the reference point. The method further includes an operation for generating views of an interactive scene in the displays of the first and second devices. The interactive scene is tied to the reference point and includes virtual objects. The view shows all or part of the interactive scene and shows the interactive scene as observed from a current location of the corresponding device. Moving the device in the 3D space causes the view to change according to the current location.

In another embodiment, a method for generating an interactive space viewable through at least a first and a second device is provided. In one method operation, a tapping between the first device and the second device is detected. After the tapping, synchronization information data is exchanged between the first and second devices to identify a reference point in a 3D space relative to the physical locations of the first and second devices in the 3D space when the tapping was detected. Additionally, the method generates views of an interactive scene in corresponding displays of the first and second devices. The interactive scene is tied to the reference point and includes virtual objects, where each view shows the interactive scene as observed from the current location of the corresponding device. Device movement in the 3D space causes the corresponding view to change according to the current location.

In yet another embodiment, a portable device for sharing a virtual reality among portable devices is presented. The portable device includes a position module, a communications module, a view generator, and a display. The position module tracks the position of the portable device and is configured to detect the location of a second device in reference to the location of the portable device. The communications module is used for exchanging synchronization information data between the portable device and the second device. A reference point in a 3D space relative to a physical location of the portable device in the 3D space is identified based on the synchronization information. Further, the view generator creates a view of an interactive scene which is tied to the reference point and includes virtual objects. The view shows all or part of the interactive scene and shows the interactive scene as observed from a current location of the corresponding device. When the device is moved by a player in the 3D space, the view changes according to the current location of the device. The display is used to show the view.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments describe methods, apparatus, and computer programs for generating an interactive space viewable through at least a first and a second device. It will be obvious, however, to one skilled in the art, that the present invention may be practiced without some or all of these specific details. In other instances, well known process operations have not been described in detail in order not to unnecessarily obscure the present invention.

Figure 1:
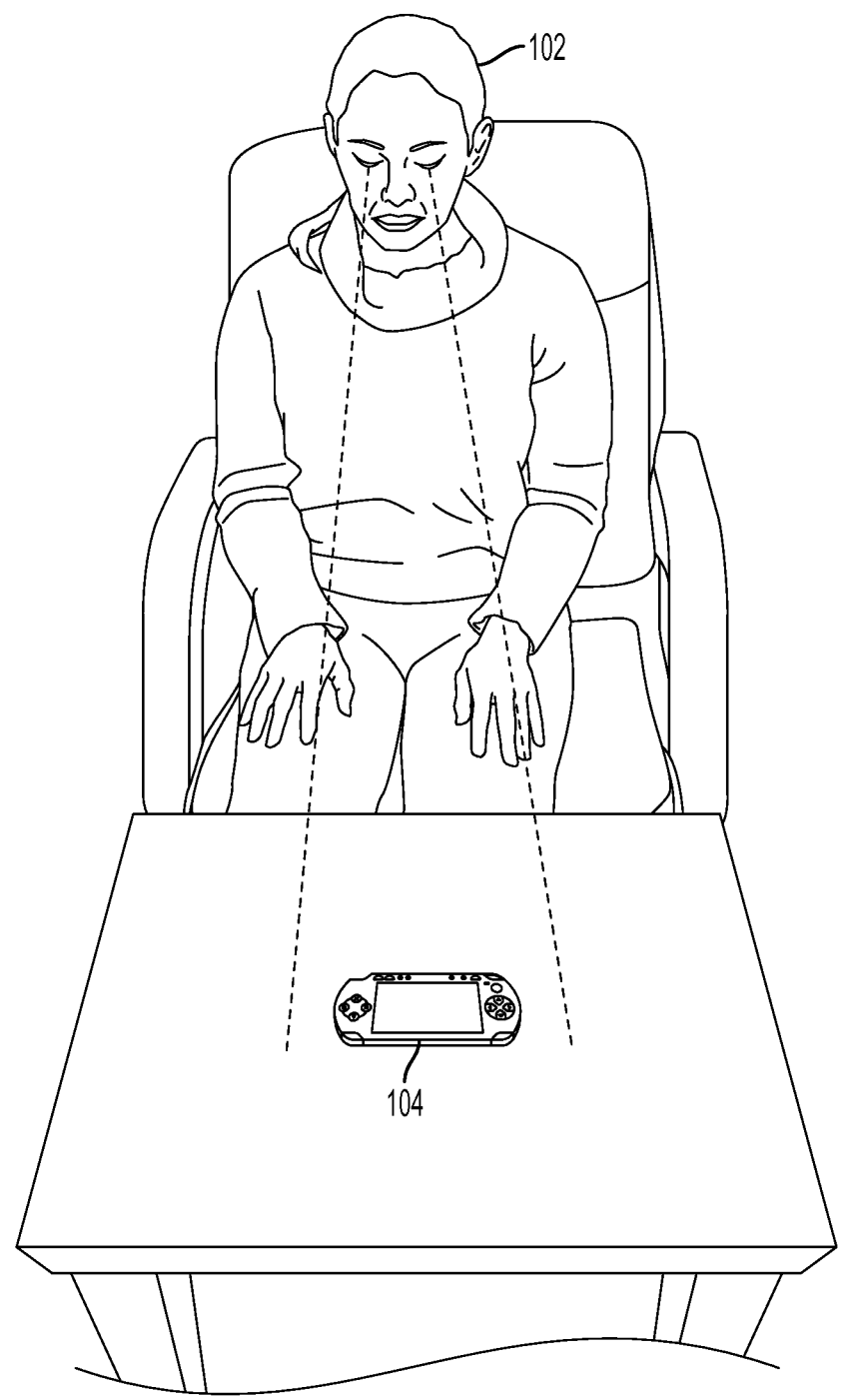
FIG. 1 depicts a user before synchronization a portable device to a reference point in space, according to one embodiment.

FIG. 1 depicts a user before synchronization a portable device to a reference point in space, according to one embodiment. Portable device 102 is standing on a table in preparation for synchronizing the portable device to a reference point. User 102 has placed the portable device in a point that will serve as a reference point or anchor to build a virtual reality around the point. In the case shown in FIG. 1, the portable device is sitting in the approximate center of a table, and a virtual world is built around the center of the table once the portable device is synchronized. The portable device can be synchronized in a variety of ways, such as pushing a button on portable device 104, touching the touch-sensitive screen in the portable device, letting the device stand still for a period of time (e.g., five seconds), entering a voice command, etc.

Once the portable device receives the input to be synchronized, position tracking modules in the portable device are reset. The portable device can include a variety of position tracking modules, as discussed below in reference to FIG. 18, such as an accelerometer, a magnetometer, a Global Positioning System (GPS) device, a camera, a depth camera, a compass, a gyroscope, etc.

The portable device can be one of many types, such as a handheld portable gaming device, a cell phone, a tablet, a notebook, a netbook, a Personal Digital Assistant (PDA), etc. Embodiments of the invention are described in reference to a portable gaming device, but the principles can be applied to any portable electronic device with a display. Principles of the invention can also be applied to game controllers or other input devices connected to a computing device with a display.

Figure 2:
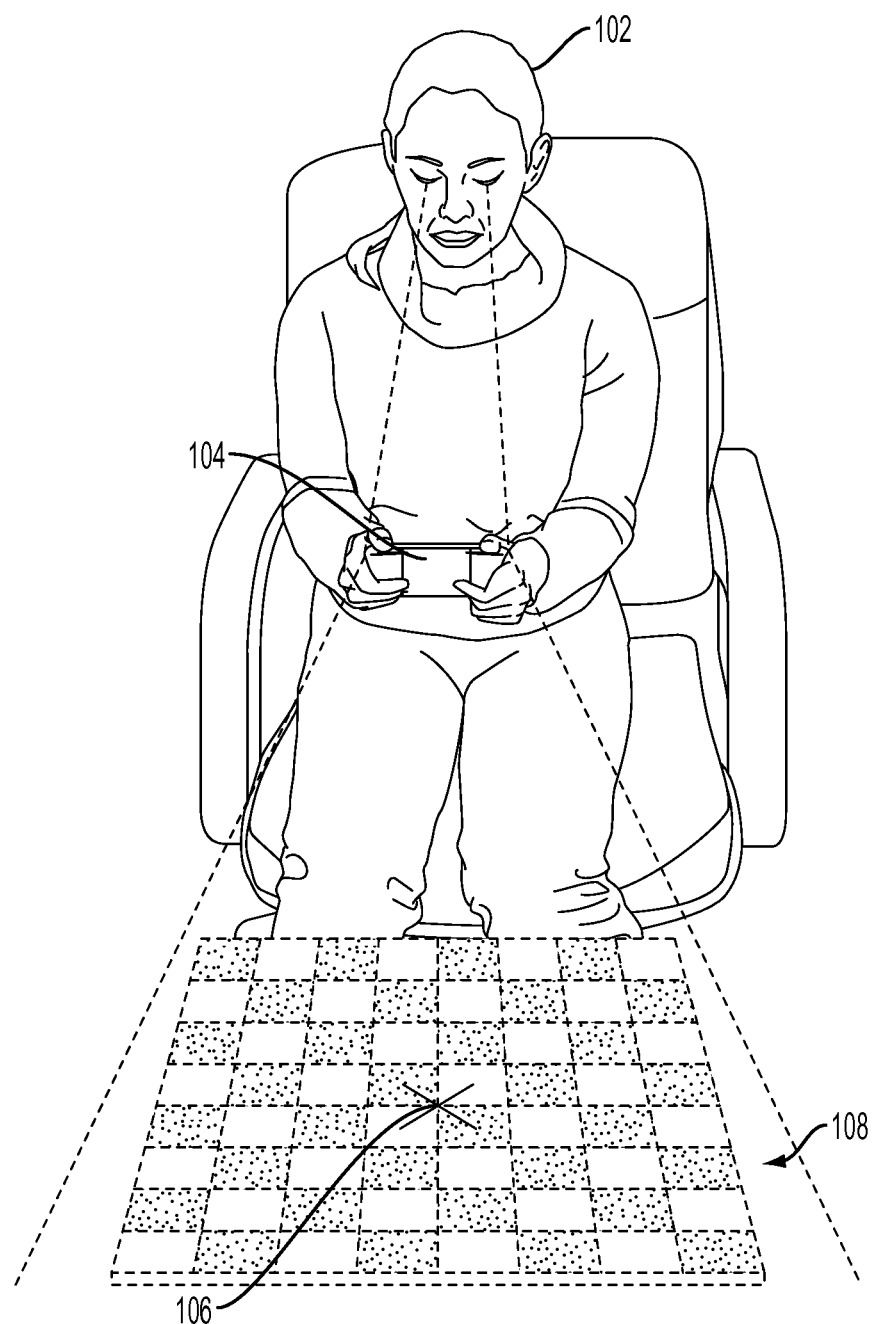
FIG. 2 illustrates a virtual reality scene observed with the portable device.

FIG. 2 illustrates a virtual reality scene observed with the portable device. After synchronizing device 104 with respect to reference points 106, the portable device will start displaying a view of the virtual reality 108. The view in the display is created by simulating that a camera in the back of the portable device moves within the 3D space around reference point 106. FIG. 2 depicts a virtual reality that includes a chess board. Portable device 104 is capable of detecting motion and determining its relative position with respect to reference point 106 as the device moves around. Location and position determination can be done with different methods and different levels of accuracy. For example, location can be detected by analyzing images captured with a camera, or data obtained from inertial systems, GPS, ultrasonic triangulation, WiFi communications, dead reckoning (DR), etc., or a combination thereof.

When the user enters a command to set the reference points, all motion sensing devices are zeroed out or calibrated to that position in space. For example, the user can place the device on the table and press a button to calibrate all motion sensing data (accelerometers, gyroscope, GPS, etc.) From this point on, all captured positional information for the device is recorded and processed relative to the initial calibrated position via inertial navigation tracking. All subsequent captured positional information is considered relative to the device calibrated position (reference point.)

In one embodiment, the device keeps track of the location in space of the portable device with respect to reference point 106, as well as the position in space of the portable device. The position is used to determine the viewing angle of the camera, that is, the portable device acts as a camera into the virtual scene. If the portable device is aimed towards the right, then the view will turn to the right, etc. In other words, the viewing angle is defined as a vector with origin in the center of the display (or other part of the device), and with a direction perpendicular to and away from the display. In another embodiment, only the position in space is tracked, and the view in the display is calculated as if the camera is aiming from the location in space where the portable device is located and towards the reference point.

In some existing implementations, an AR tag is placed on a table, and utilized as a fiduciary marker for generating the augmented reality. The AR tag may be an object or figure that is recognized when present in the captured image stream of the real environment. The AR tag serves as a fiduciary marker which enables determination of a location within the real environment. Embodiments to the invention eliminate the need for AR Tags, because of the calibration within the 3D space and the location tracking of the portable device. Additionally, the location information allows games in the portable device to deliver a realistic 3D virtual experience. Further, an array of networked portable devices can be used to create a shared virtual world, as described below in reference to FIGS. 15 and 16.

Figure 3:
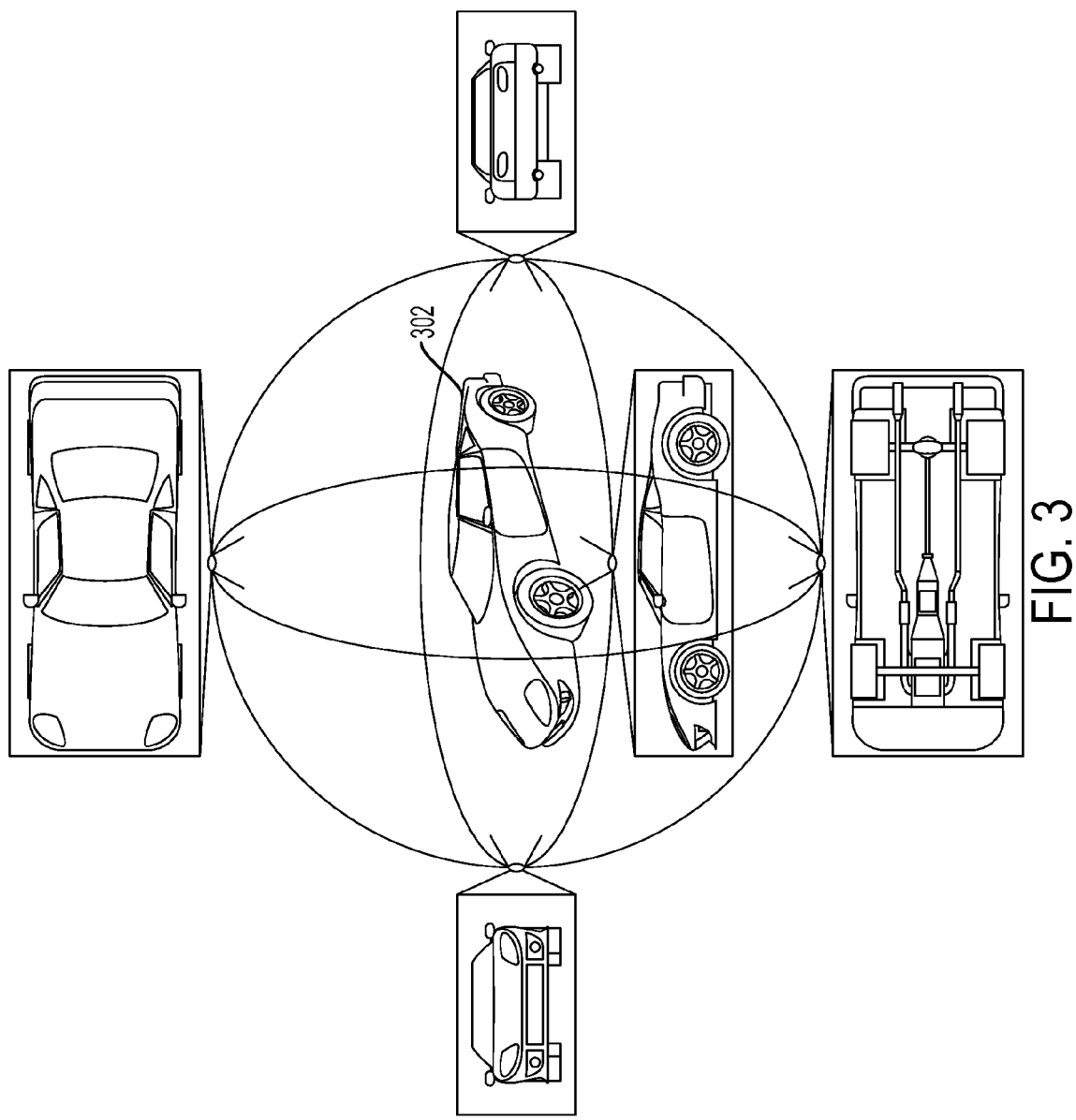
FIG. 3 illustrates how movement of the portable device has a similar effect on the display as when moving a camera in the virtual space, according to one embodiment.

FIG. 3 illustrates how movement of the portable device has a similar effect on the display as when moving a camera in the virtual space, according to one embodiment. FIG. 3 shows car 302 inside a virtual sphere. Assuming that a portable device is aimed from a point in the sphere towards car 302, multiple views of the car can be obtained as the portable device moves within the sphere. For example, a view from the "north pole" will show the roof of the car, and a view from the "south pole" will show the bottom of the car. Also shown in FIG. 3 are views for the side, front, and rear of the car.

In one embodiment, the player can enter a command to change or flip the view of the virtual world. For example, in the case of the car, a player goes from seeing the front of the car to seeing the back of the car, as if the scene had rotated 180° around and axis running vertically through the reference point. This way, the player does not have to move around the room to get different viewing angles. Other inputs may produce different effects, such as a 90° turn, a scaling of the view (to make the virtual world seem smaller or greater), rotation with respect to the x, y, or z axis, etc. In another embodiment, a flip of the portable device, i.e., a 180° spin on the player's hand will cause view of the virtual world to flip upside down.

Figure 4:
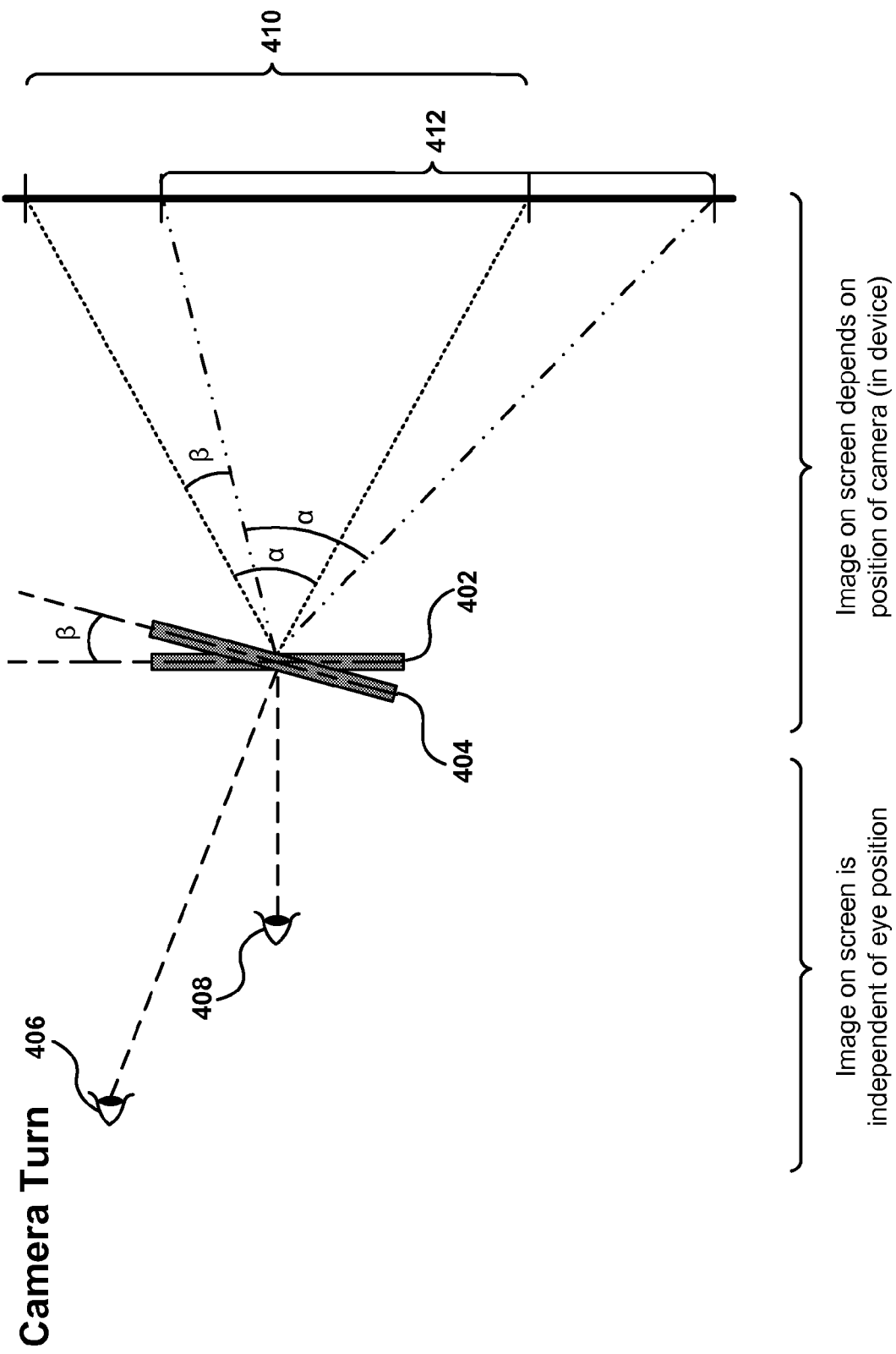
FIG. 4 shows a two-dimensional representation of the change in the image shown in the display when turning the portable device, according to one embodiment.

FIG. 4 shows a two-dimensional representation of the change in the image shown in the display when turning the portable device, according to one embodiment. Portable device 402 is aimed towards a wall with a viewing angle α, resulting in a projection 410 on the wall. Thus, the view on portable device 402 will correspond to projection 410. When device 402 is turned an angle β, the portable device ends in position 404. The view also turns an angle β while maintaining a camera viewing angle α. As a result, the view on the portable device corresponds to projection 412. It should be noted that the view on the screen is independent of the eye position, such as positions 408 and 406, and the view is independent from where the player is. The image on the display depends on the position of the portable device, which is acting as a virtual camera.

Figure 5:
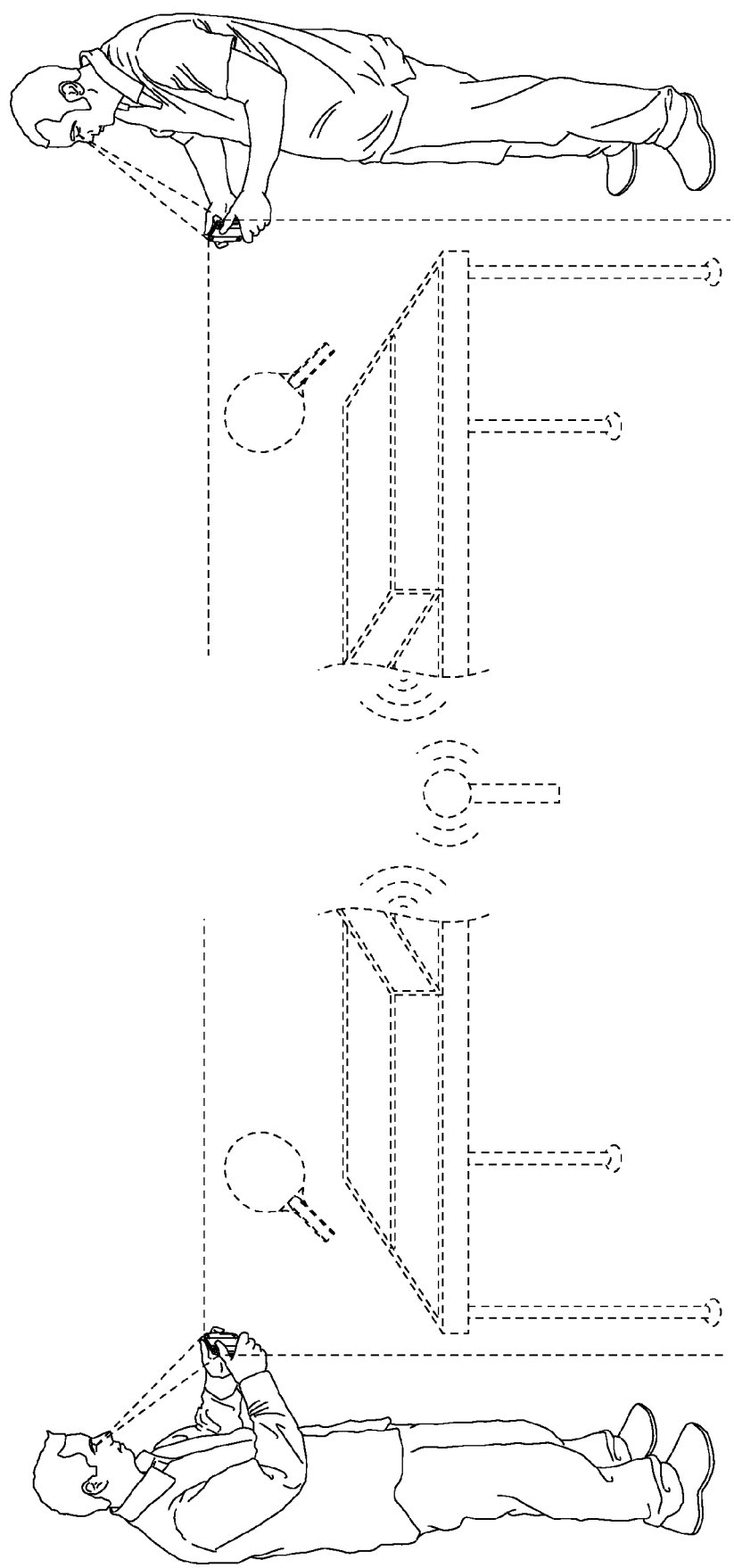
FIG. 5 illustrates how to play an interactive game over a network connection, according to one embodiment.

FIG. 5 illustrates how to play an interactive game over a network connection, according to one embodiment. Many types of games are possible within a shared space. For example, the portable device can be used as a paddle to play a game of ping-pong. The device is moved around as if it where a paddle that can hit a virtual ball. Players see the ball float between the screen and the opponent's screen. In an embodiment of a war game, the player looks through the portable device and aims the catapult at the enemies' ramparts. The player pulls the device backwards to load the catapult, and then press a button to fire the catapult toward the enemies' castle.

Shared spaces can also be created when players are in different locations, as shown in FIG. 5. The players have established a network connection to play the game. Each player synchronizes his device to a reference point in the player's space, and a virtual reality is created, such as a ping-pong table. The opponent is shown behind his side of the table, where the movement of an opponent's device is matched to the motions of the opponent's paddle. The game may also add an avatar to hold the paddle, for an even more realistic game experience. During play, each device keeps track of the motion and position of the device. This information is shared with the other device to enable the other device to place a virtual paddle that matches the motion of the device. Other game information is also shared, such as the location and movement of the ball.

Figure 6:
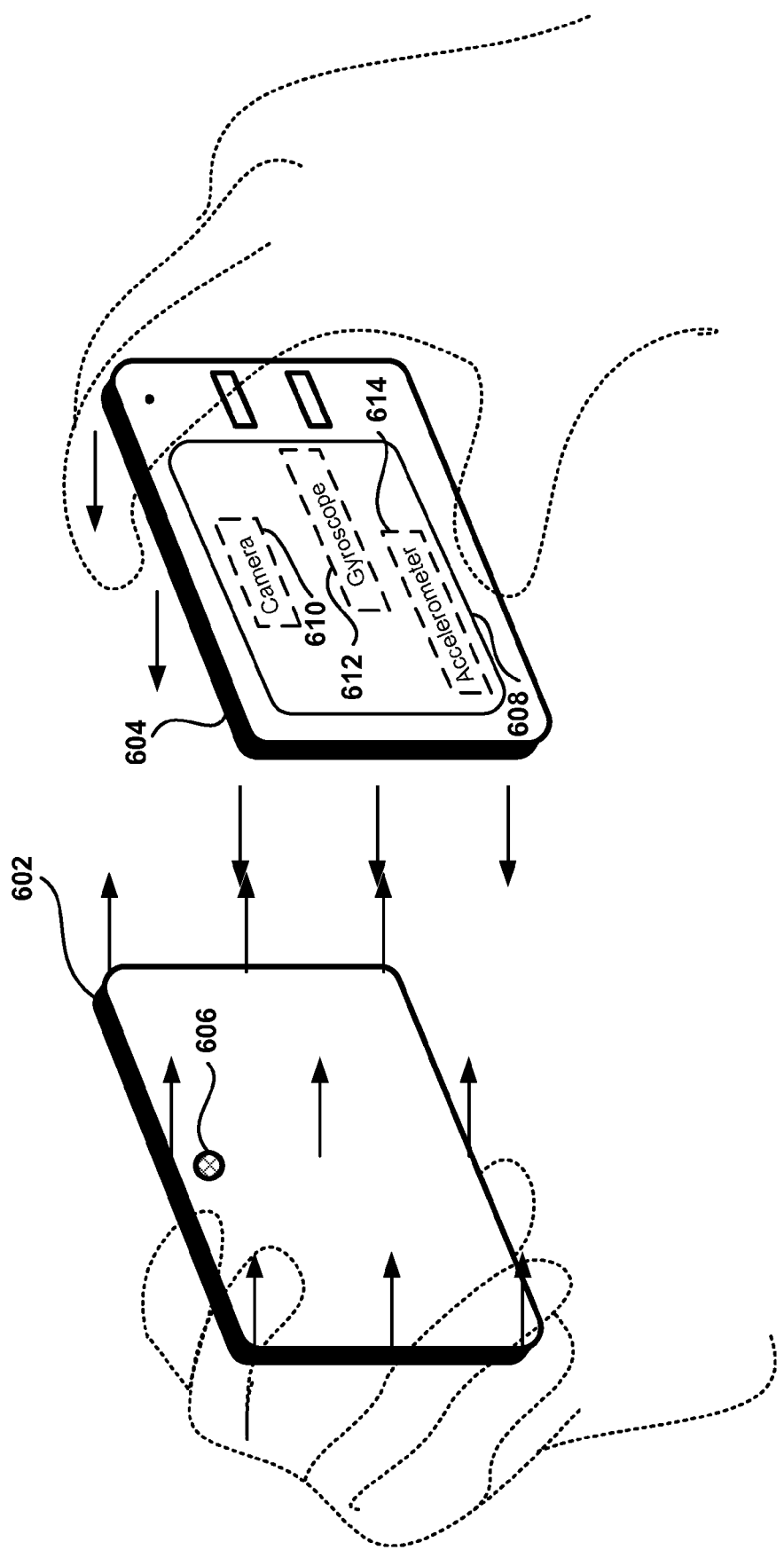
FIG. 6 illustrates the process of tapping two portable devices to synchronize their positions, according to one embodiment.

FIG. 6 illustrates the process of tapping two portable devices to synchronize their positions, according to one embodiment. One method for setting a common virtual or augmented space includes tapping the two portable devices. Tapping means striking lightly one device against the other. In the scenario shown in FIG. 6, two players are holding portable devices 604 and 606, respectively. In order to calibrate both devices to the same reference point, the players tap the devices by placing both devices together. In FIG. 6, both devices are placed back to back, but any position is possible for calibration, such as front to back. The key to detect the tapping is that one or two of the devices notices an abrupt change in motion, such as a sudden deceleration of the device.

For example, both devices can be moving towards each other, and when they tap, both devices come to a stop. The inertial modules in the devices, such as gyroscope 612 and accelerometer 614, notice the change of momentum and then the tap can be established. In another scenario, one portable device is stationary while the other portable device moves towards the stationary device. When the devices tap, the moving device will notice a sudden change in momentum while the stationary device may or may not detect the tapping as a small change in momentum can be attributed to the natural motion of the player's hand. To detect the tapping, it is enough that one device detects the tapping, and it is not a requirement that both devices detect the tapping simultaneously. In one embodiment, both devices detect the tapping and if the detection is substantially simultaneously, then it is determined that the tapping has occurred. To determine that the detection if simultaneous, the devices exchange timing information regarding the event.

In another embodiment, once portable devices 602 and 604 are synchronized to the same virtual space, their movement is tracked with accelerometer 614, enabling the creation of a stable and persistent augmented reality environment regardless of how the portable device is moved by the user. In yet another embodiment, the inertial movement information can be complemented with image data captured with camera 606 or 610. The image data can be used to detect the other device and estimate the distance between the devices, as discussed in more detail below in reference to FIGS. 10A-12.

Figure 7:
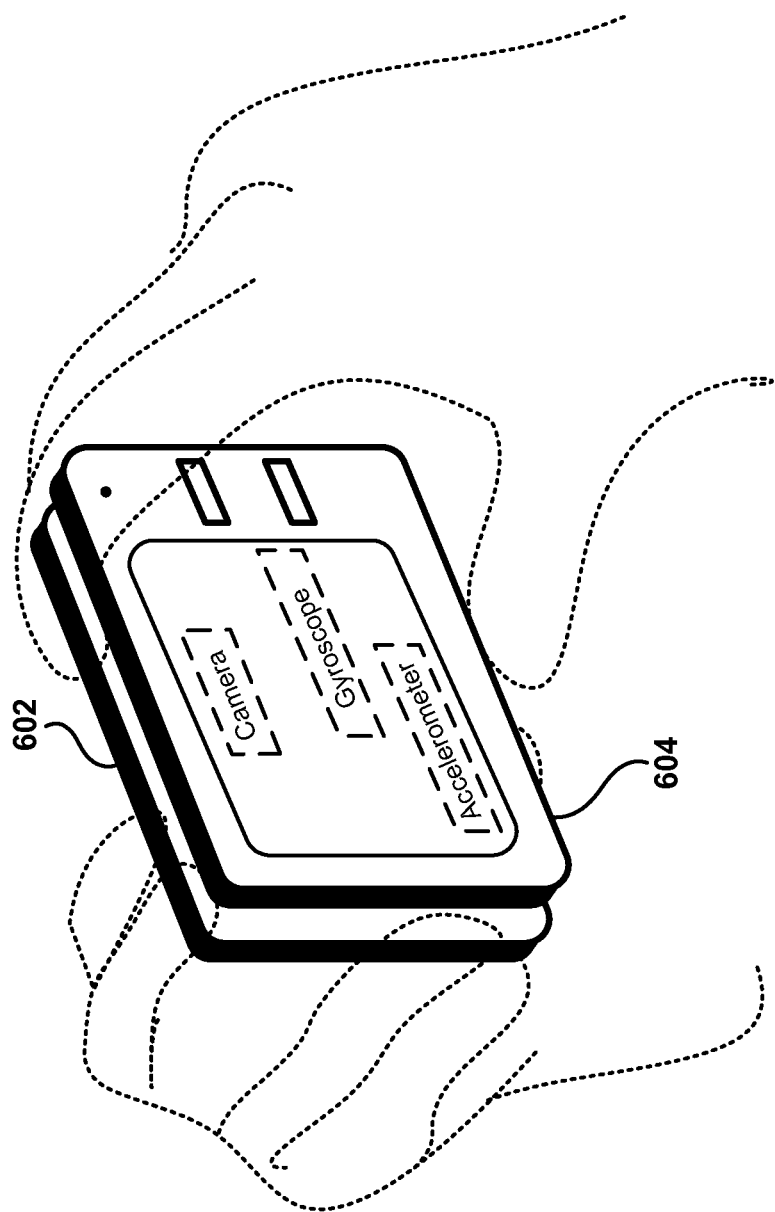
FIG. 7 shows two portable devices after tapping, according to one embodiment.

FIG. 7 shows two portable devices after tapping, according to one embodiment. Tapping can be done by having portable devices touch, but tapping can also be done without having both devices actually come in contact. All that is required is that their change in motion occurs at about the same time. For example, if the fingers of a player gets is behind a first device, the tapping will be detected when the second device touches the fingers of the player, causing the change in motion of the devices.

Once the tapping is detected, by either device or by both devices, the portable devices exchange data to confirm that the tapping has occurred. For example, the devices can communicate via WiFi or ultrasonic communications. A reference point is created, as previously discussed in FIGS. 1-2. The reference point can be situated somewhere in the back of the devices, such as the center of each device when the devices tap. In another embodiment, the exchange of data can be performed using a TransferJet interface. TransferJet is an interface that enables communication when close proximity is detected between two devices.

It should be noted, that the actual reference point for each device may not be the exact same point in space for both devices. In other words, each device may have a different reference point, although in most cases, the reference points will be proximate to each other. The important thing is that both devices set up a reference point and then start tracking movement around the virtual or augmented space. The result is a common virtual space. The reference point can be set in the center of the back of the portable device, in the center of the display, where the camera is located, where the accelerometer is located, etc.

Once the reference point is set, the motion tracking modules are reset to zero to set an origin point to measure position in space. This operation is referred to herein as calibrating the portable devices, and the calculation of the three-dimensional position of the portable device is computed in reference to this origin.

Figure 8:
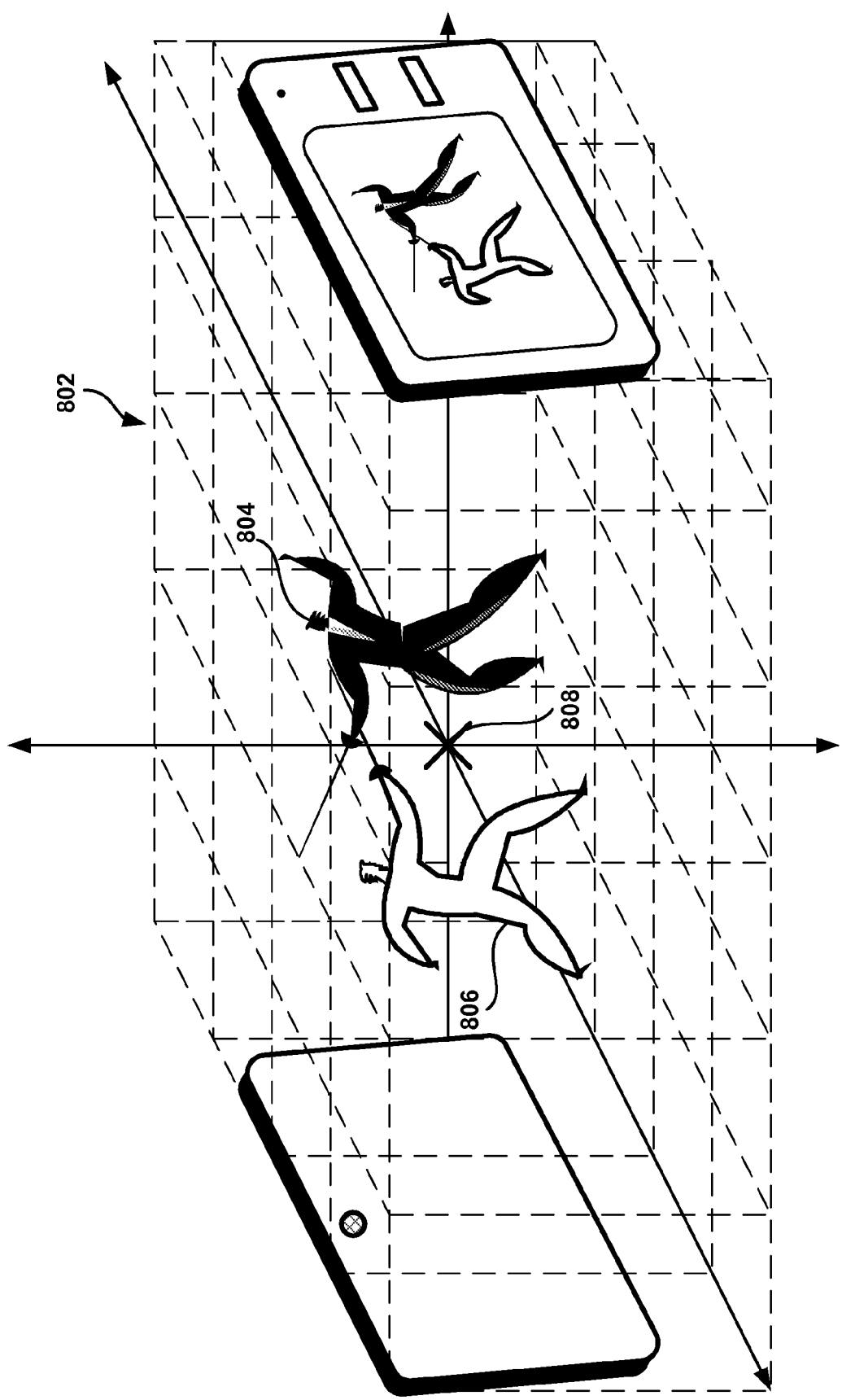
FIG. 8 illustrates the creation of a virtual scene around the reference point, in accordance with one embodiment of the invention.

FIG. 8 illustrates the creation of a virtual scene around the reference point, in accordance with one embodiment of the invention. As the two portable devices of FIG. 7 are pulled apart, a virtual or augmented reality play area is created. The virtual objects, such as fighters 804 and 806, are assigned corresponding positions in the 3D space where the portable devices are located. The coordinate origin in the 3D space is reference point 808. Because the virtual objects are positioned relative to a point in space, there is no need for SLAM or ARTAG for maintaining augmented realities.

The virtual camera associated with the view from the display is controlled is by physically moving the portable device around the game world, which has been placed in a fixed position in reference to the real world. It should be noted that the virtual world is not confined to the space between the portable devices, but can expand and cover areas above, below, and behind any of the portable devices.

Figure 9:
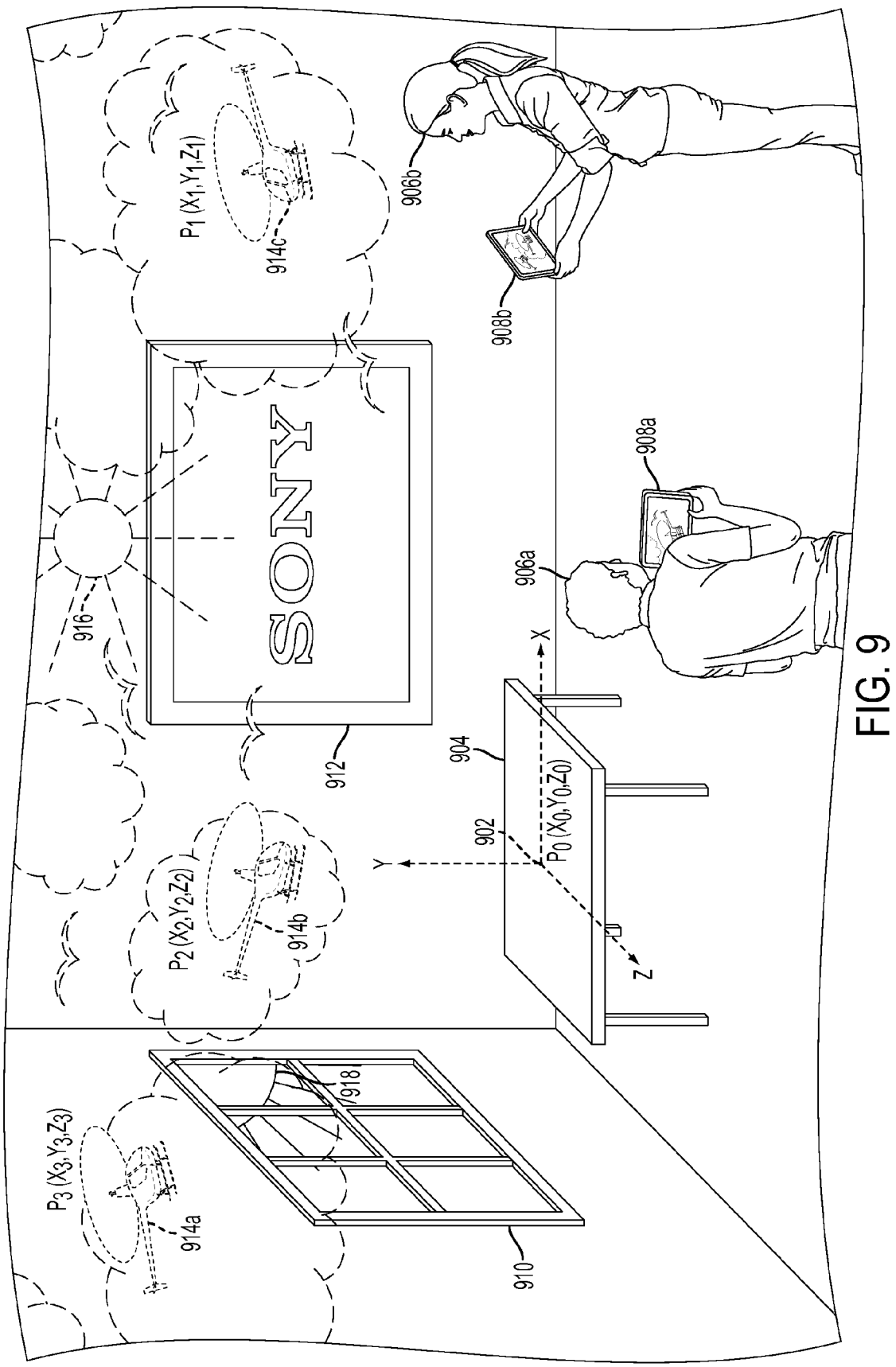
FIG. 9 depicts two players in the same space where a virtual reality has been created around a reference point on a table, according to one embodiment.

FIG. 9 depicts two players 906a-906b in the same space where a virtual reality has been created around reference point 902 on table 904, according to one embodiment. Players 906a and 906b have synchronized their devices 908a and 908b to common reference point 902, which is located on top of table 904. Since point $P_0$ 902 is the reference point, $P_0$ is also the coordinate origin and it has coordinates ($X_0=0, Y_0=0, Z_0=0$). The players are inside a room but the virtual reality, also referred to herein as virtual scene, extends beyond the physical boundaries of the room.

In one example embodiment, the virtual scene is tied to the reference point because the geometry of the virtual scene (as seen through a screen of the device) is based, at least in part, on the reference point. For example, the coordinates of the virtual objects in the virtual scene may be determined with respect to the reference point. In one embodiment, the reference point is the coordinate origin, thus the reference point has coordinates (0, 0, 0).

The coordinates can be measured using any standard of measure. However, to provide a visual example, and without limitation on actual coordinates used, if the coordinates of the virtual scene are measured in meters, an object with coordinates (1, 0, 0) would be situated one meter to the right of the reference point. Of course, the coordinates of objects, real or virtual, may be dynamically updated as the scene changes, such as when a virtual object moves within the scene. And, the changes can be defined by actions set by the computer (e.g., interactive program), driven by actions of the user, or combinations of both. Additionally, for sake of clarity, the interactive program can by any type of program, such as a video game, a business program, an internet interface, or simply a graphical user interface that provides access to data, to other users, to programs, or to objects that may or may not be displayed or projected by a speaker.

Still further, other embodiments may have different coordinates systems or use scaling. For example, the coordinate system, instead of being a Cartesian system, can be polar, spherical, parabolic, etc. Additionally, the reference point does not have to be the origin of the coordinate system, and can be positioned at a different place. For sake of providing an example, the reference point can be located at coordinates (5, 5, 5) to enable a buffer of 5 meters in each direction before having to use negative coordinate values in points beyond the 5 meters. In another scenario, the virtual objects are built to scale and the coordinates are also measured in a scale. For example, the virtual objects may be built on a scale of 1:10, and the geometric axis can also have a scale of 1:10, such that an object with coordinates (1, 0, 0) is 1 meter away in the "real" world and 10 meters away in the virtual world.

In FIG. 9, virtual objects include helicopters 914a-914c, clouds, birds, sun 916, etc. As players 906a and 906b move their devices, the view of the virtual scene changes as if the players were holding a camera into the virtual world. It should be noted that the view shown in devices 908a and 908b may include or may not include the reference point. For example, device 908a held by player 906a is aiming away from reference point 902, therefore reference point 902 is not viewable in device 908a, although the view in device 908a is calculated based on the locations of device 908a and reference point 902. Further, the actual reference point may be seen in a player's display as some kind of marker (such as an "X") to let the player know where the reference point. In other embodiments, the reference point is not viewable and it exists only as a geographical location without any particular markers.

The room includes other static objects besides table 904, such as television 912 and window 910. Sun 918 is visible through window 910. It should be noted that virtual sun 916 does not have to correspond to actual sun 918. In one embodiment, virtual sun 916 can be placed where the actual sun 918 is located, or where a source of light is located in the room. This way, lighting and shadows in the virtual or augmented world will create realistic effects matching the lighting and shadows in the room.

As seen in FIG. 9, just because the portable devices are synchronized to a point on a table, the virtual objects do not have to be on the table or near the reference point. The virtual objects can be located anywhere in space. When the portable devices include a camera, the static features in the room can be used by the portable devices to maintain an accurate measurement of the current position by adjusting their inertial measurements with the views from their cameras. Image analysis in the portable device can detect the edges of a window, a light source, the edges of the table, a painting on the wall, a television, etc. More details are described below in reference to FIGS. 13-14.

In one embodiment, the players can do a rapid recalibration of the portable device, by placing the device on the reference point again, and then entering a command to reset the motion detection modules in the device.

Figure 10A:
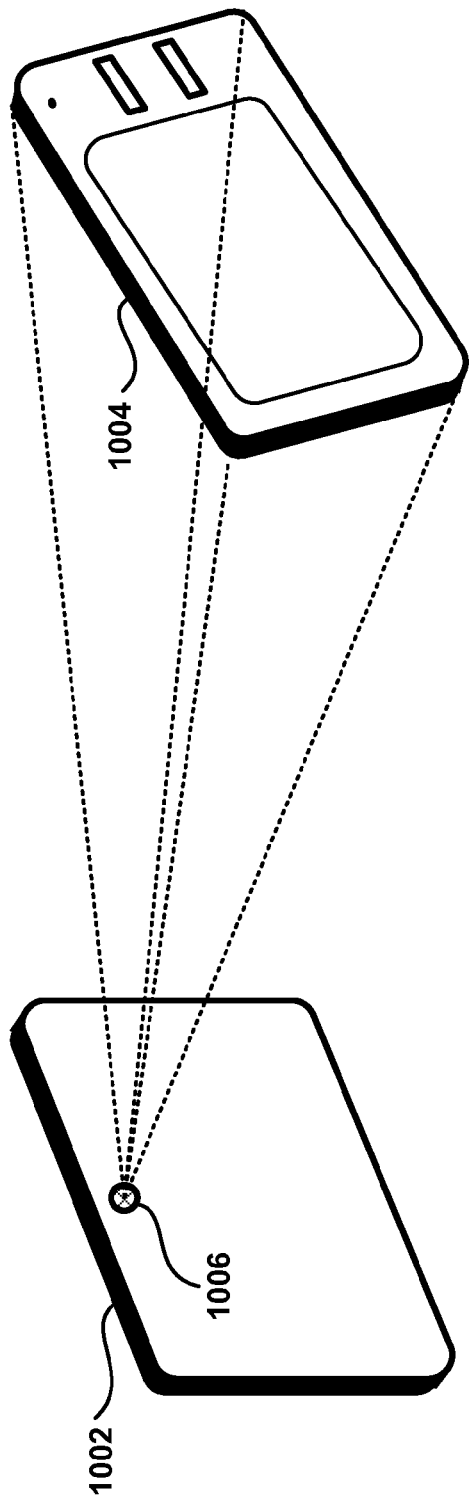
FIGS. 10A-10B illustrate the process of detecting a location of another portable device using image recognition, according to one embodiment.
Figure 10B:
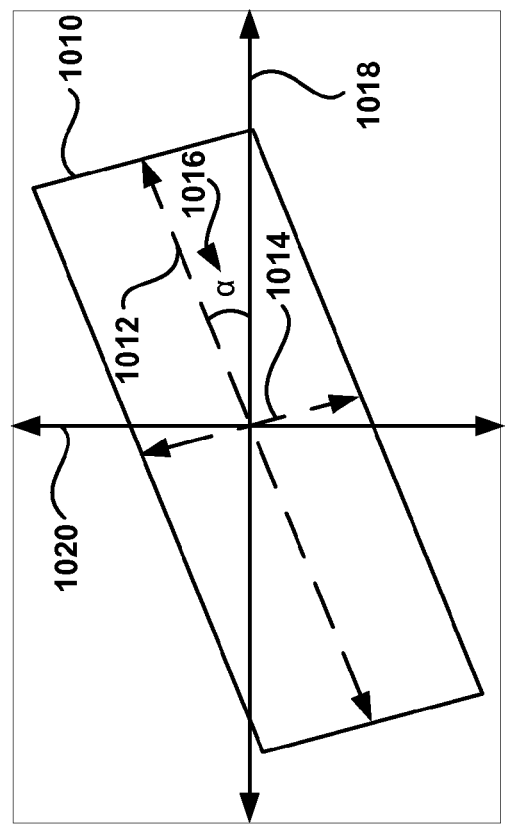

FIGS. 10A-10B illustrate the process of detecting a location of another portable device using image recognition, according to one embodiment. If both portable devices are the same model and include a camera 1006, it is possible to use camera-captured images to synchronize both devices, as seen in FIG. 10A. For example, portable device 1002 has taken an image with camera 1006. Since portable device 1002 has received a command to synchronize, portable device 1002 is scanning the image for the back of the other portable device 1004. An schematic of the image taken is shown in FIG. 10B.

Portable device 1022 has detected a rectangle 1010 that matches the characteristics of the portable device being searched. Rectangle 1010 has horizontal axis 1012 and vertical axis 1014. Horizontal axis 1012 is tilted and angle α with respect to horizon 1018. Since portable device 1002 knows the dimensions of the other portable device 1004, portable device 1002 makes the proper mathematical calculations comparing the size of the portable device in the image with the real measurements to determine the distance, location, and orientation of portable device 1004.

Once portable device knows the relative position of portable device 1004, portable devices 1002 and 1004 exchange location information to set the common reference point and build the common virtual or augmented reality around the reference point.

Figure 11:
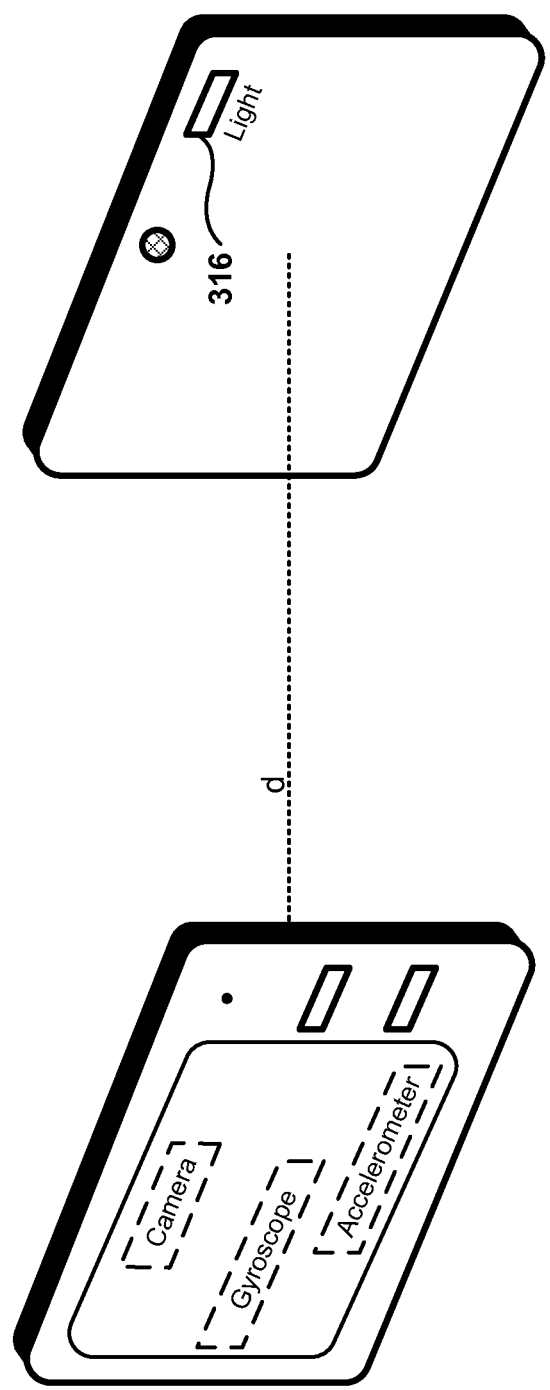
FIG. 11 shows how to detect the second device by finding a light source in the second device, according to one embodiment.

FIG. 11 shows how to detect the second device by finding a light source in the second device, according to one embodiment. The synchronization process of FIG. 11 is similar to the process described above in reference to FIG. 10, except that portable device 1102 has a light source that is detected by the other portable device. When the portable devices are in the process of synchronizing, the light source is turned on to facilitate the detection of the light within the image taken with the camera. The light source can be a Light-Emitting Diode (LED), an infrared light, a camera flash, etc.

In another embodiment, a depth camera in one portable device is used to measure the distance to the other device. Once the distance is known, the reference point can be set based on the position of either device. Additional data, such as image data, can also be used to complement the calculations of the relative positions of the devices.

It should be noted that it is possible that both devices detect each other at about the same time. In this case, the calculation of the relative position of the portable devices can be done by one portable device or by the other, or it can be a combination of the measurements taken by both portable devices.

Figure 12:
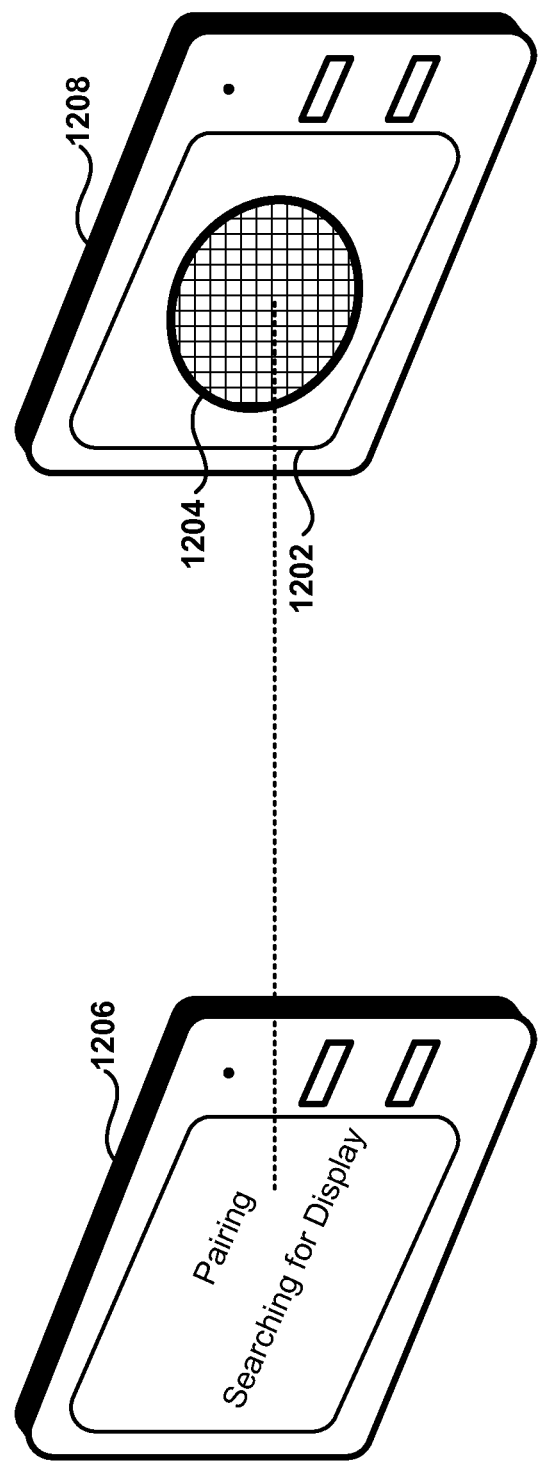
FIG. 12 illustrates detecting the second device by finding the display of the second device, according to one embodiment.

FIG. 12 illustrates detecting the second device by finding the display of the second device, according to one embodiment. When calibrating portable devices 1206 and 1208 to a common space, one of the devices, such as portable device 1208 is "turned around" such that display 1202 is facing the camera in portable device 1206. For example, portable device 1208 has shown a message asking the user to "turn device around in order have display facing other portable device."

Display 1202 can then be brightly lit, such as for example showing a white screen. The brightness of the display facilitates the detection by portable device 1206 of the display. A brightly lit display shows a high contrast against most backgrounds, including in many cases the front of the player holding the device. Other patterns or colors can be added to the display to improve its detection. For example, FIG. 12 shows a circle with a square pattern inside for easier recognition of the display using geometry.

Other methods for calibrating both devices, also referred to as pairing, can be found in U.S. application Ser. No. 12/647,291 filed Dec. 24, 2009, and entitled "WIRELESS DEVICE PAIRING METHODS"; U.S. application Ser. No. 12/647,296 filed Dec. 24, 2009, and entitled "WIRELESS DEVICE PAIRING AND GROUPING METHODS"; and U.S. application Ser. No. 12/647,299 filed Dec. 24, 2009, and entitled "WIRELESS DEVICE MULTIMEDIA FEED SWITCHING", which are incorporated herein by reference.

In another embodiment, portable device 1208 has two displays, one in the front and one in the back. In this case, it is not necessary to turn around portable device 1208 in order to have the display face the other player. Portable device 1206 will be able to detect either the display in the front or the display in the back from portable device 1208 to perform the calibration.

Figure 13:
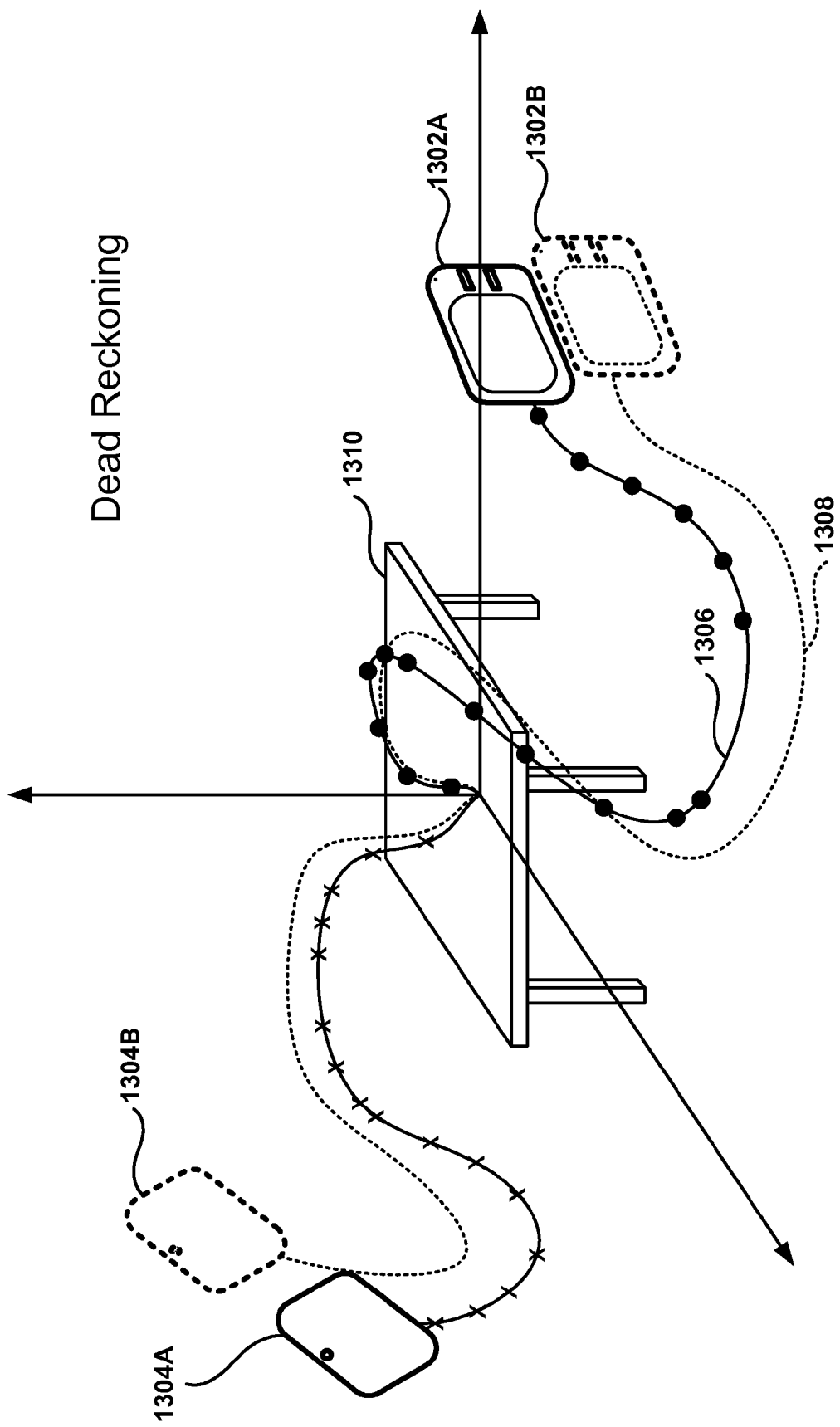
FIG. 13 shows an embodiment for tracking the portable device via dead reckoning.

FIG. 13 shows an embodiment for tracking the portable device via dead reckoning. If the portable device is equipped with a camera facing away from the users face, then it is possible to know the position of the device via dead reckoning and inertial navigation. Additionally, the cameras real-world views can be blended with computer generated graphics.

Dead reckoning is the process of estimating a current position based upon a previously determined position, or fix, and advancing that position based upon known or estimated speeds over elapsed time and course. A disadvantage of dead reckoning is that since new positions are calculated solely from previous positions, the errors of the process are cumulative, so the error in the position fix grows with time.

FIG. 13 shows two portable devices that have been calibrated to a point on table 1310. Over time, device 1302A has travelled around the room, as observed in dead-reckoning measured trajectory 1306. The points in trajectory 1306 show the times where the position was estimated using the previous position and the movement of the portable device 1302A since the last measurement. On the other hand, real trajectory 1308 shows the actual trajectory of the portable device in space. Over time, the measured trajectory tends to diverge farther and farther apart from the real trajectory due to the nature of dead reckoning and error accumulation. However, dead reckoning tracking can be adjusted to correct the deviation from the actual trajectory, as described below in reference to FIG. 14.

Figure 14:
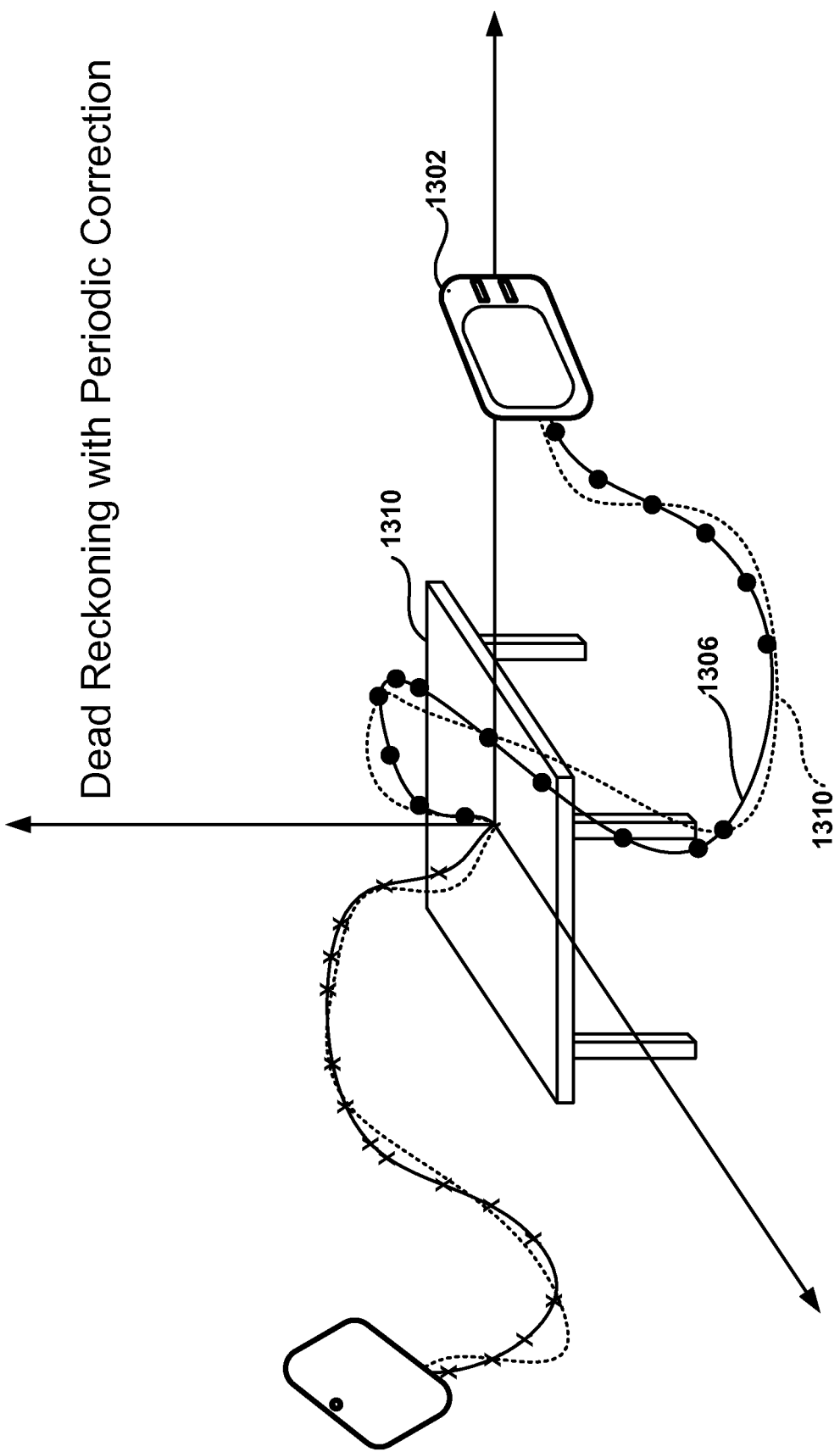
FIG. 14 illustrates how to adjust dead reckoning using static features in the background, according to one embodiment.

FIG. 14 illustrates how to adjust dead reckoning using static features in the background, according to one embodiment. The dead reckoning drift is usually small, but the accumulation of error over time can create larger deviations from actual course. In one embodiment, the DR errors are corrected by video tracking static patterns in the room, such as an edge of table 1301, a window, a television, etc., as previously described in reference to FIG. 9.

Error correction can be performed at every DR position measurement, or at certain intervals, or every certain number of measurements. To perform a correction, DR calculates the position of the device and the camera takes an image in front of the device. Portable device keeps track of one or more static features and compares the actual location of the static feature with the expected location. Since static features do not move, the difference is attributed to DR reckoning error. The position is recalculated in order to have the expected static feature and the measured static feature be in the same place.

In another embodiment, the portable devices communicate with each other and coordinate the motion tracking of both devices by exchanging DR and feature information. This way a realistic 3D model of the static objects in the room can be obtained.

Figure 15:
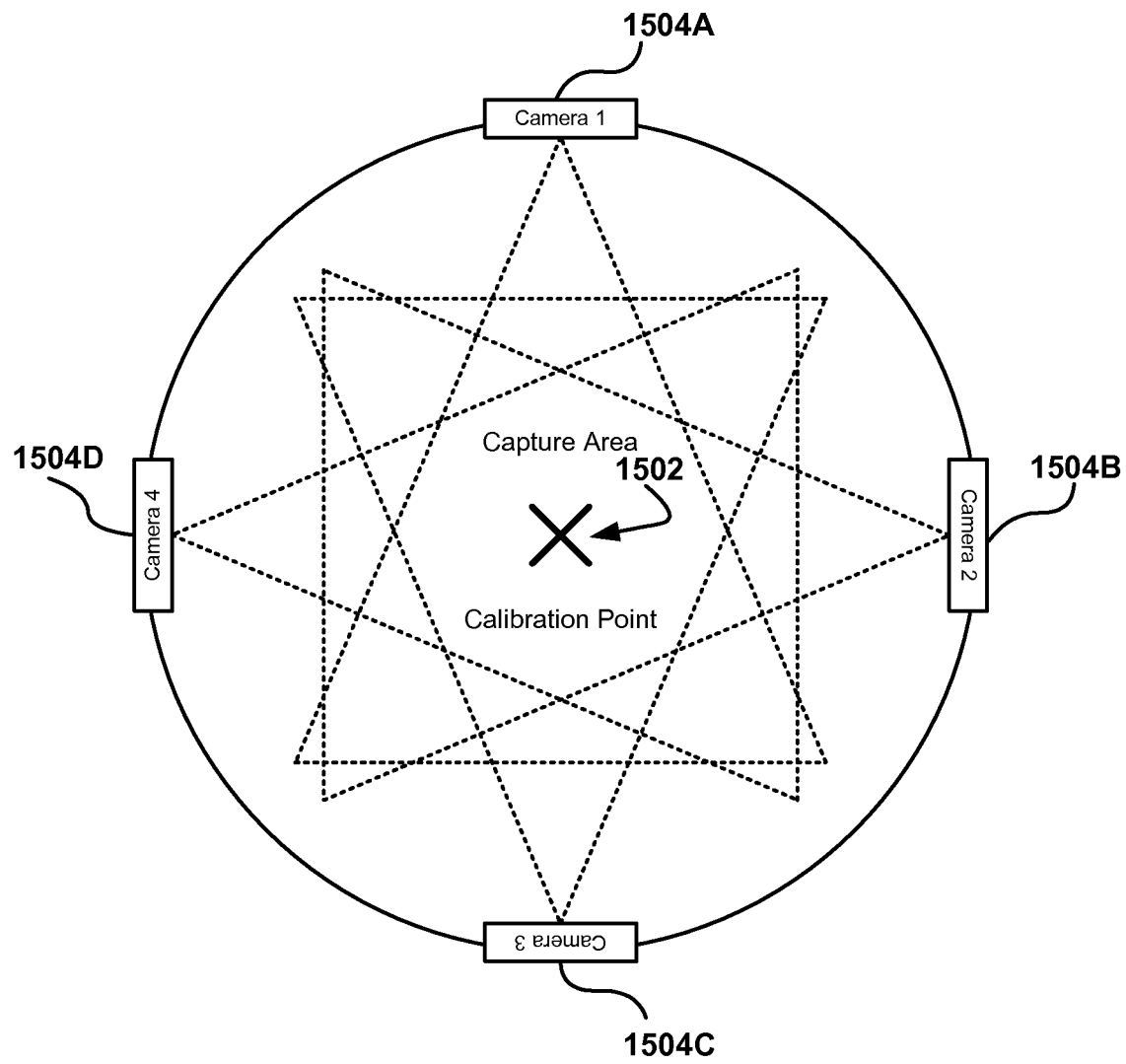
FIG. 15 illustrates one embodiment of a calibration method for a multi-player environment.

FIG. 15 illustrates one embodiment of a calibration method for a multi-player environment. The positional information gained from the devices sensors (accelerometers, GPS, compass, depth-cam, etc.) is transmitted to other linked devices to enhance the collaboratively maintained data in the virtual space. In one embodiment for creating a common shared space synchronized to a common reference point 1502, a first player 1504A synchronizes her device into the 3D space with respect to reference point 1502. Other players in the shared space establish a communication link with the first player to exchange position and game information. The relative position can be obtain in different ways, such as using WiFi triangulation and ping tests to determine relative positions. In addition, visual information can be used to determine other locations, such as detecting faces of other players and from their faces, possible locations of gaming devices.

In one embodiment, audio triangulation is used to determine relative position, by means of ultrasonic communications and directional microphones. Multiple frequencies can be used to perform the audio triangulation. Once the devices have exchanged position information, wireless communication, such as ultrasonic, WiFi, or Bluetooth, is used to synchronize the rest of the devices to reference point 1502. After all the devices are calibrated, the devices have knowledge of the reference point 1502 and their relative position with respect to reference point 1502. It should be appreciated that other methods can be used to calibrate multiple devices to a shared reference point. For example, all devices may calibrate to the same reference point by placing the device on the reference point in turns.

The virtual scene can be made even more realistic by using shadows and lighting determined by the lighting sources in the room. By using camera feeds, game environments and characters have scene lighting and shadows influenced by the real world. This means that a player's hand will cast a shadow over virtual characters or objects as the hand are reaches into the virtual world to interact with the virtual objects. Game world shadows and lighting are adjusted by real world shadows and lighting to get the best effect possible.

Figure 16:
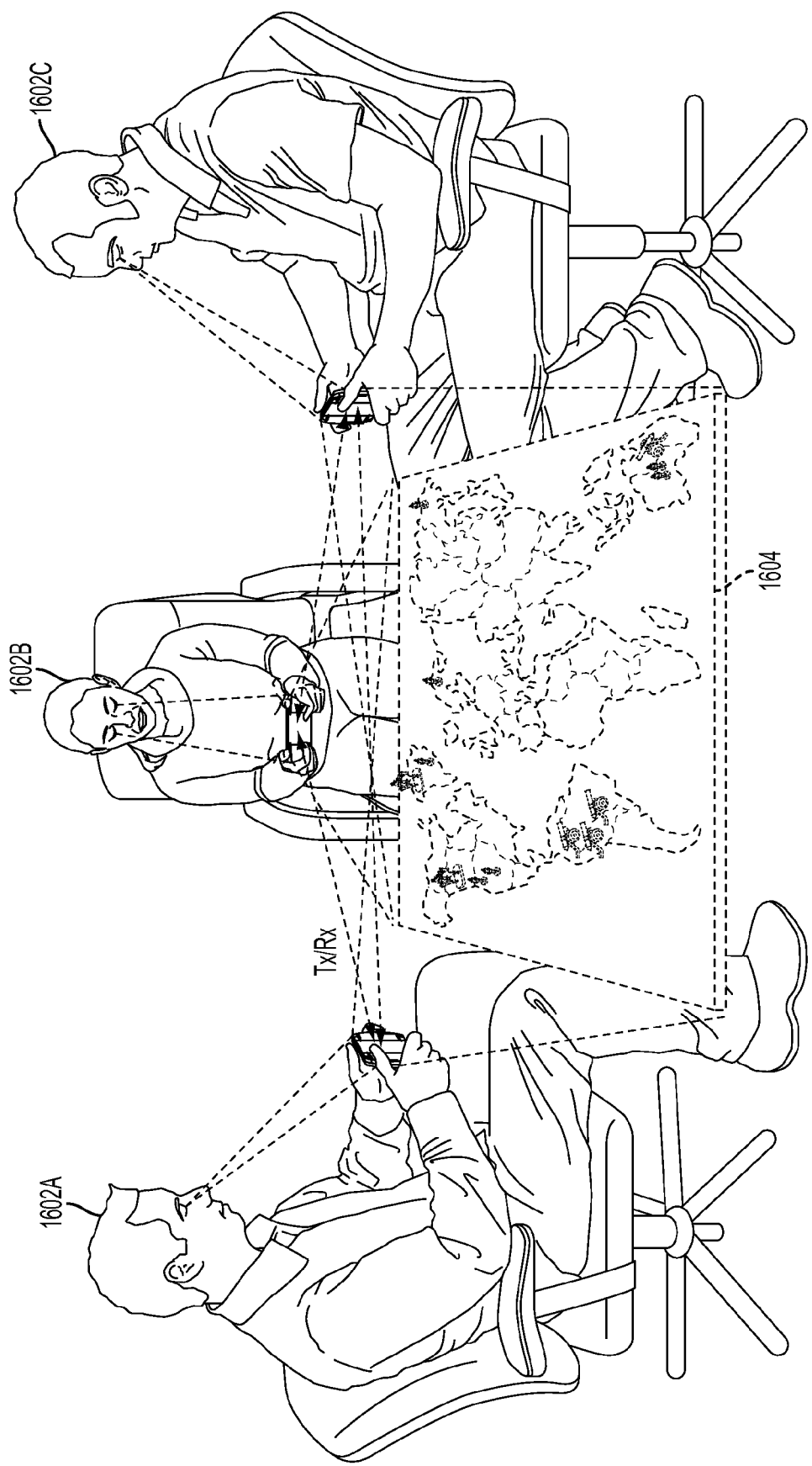
FIG. 16 depicts a multi-player virtual reality game, according to one embodiment.

FIG. 16 depicts a multi-player virtual reality game, according to one embodiment. When calibrated positional and image analysis data is combined with high speed connectivity, positional and game information can be exchanged between each of the devices that choose to participate in a shared-space game experience. This allows each player's system access to the camera view and positional information from all other players to synchronize their calibrated positions and share a virtual space, also referred to as shared space, together.

After players 1602A-1602C have synchronized or calibrated their portable devices in reference to a point in the common 3D space (such as a point on a table), the common virtual scene 1604 is created. Each player has a view of the virtual scene 1604 as if the virtual scene, a battle board game in this case, were real on a table in front of the players. The portable devices act as cameras, such that when the player moves the device around, the view changes. As a result, the actual view on each display is independent from the view in other displays and the view is based only on the relative position of the portable device in respect to the virtual scene, which is anchored to an actual physical location on the 3D space.

By utilizing multiple cameras, accelerometers and other mechanical devices to determine position, together with high speed communication between portable devices, it is possible to create a 3D motion capture-like experience allowing players to see, and possibly touch, virtual game characters and environments in believable ways.

Share Space 1604 games utilize devices' high-speed connectivity to exchange information among devices participating in the Share Space game experience. The Share Space 1604 play areas are viewed through the device by turning the device into a stable "magic window" that persists in a space between each of the devices. By using a combination of motion tracking, image analysis, and high persistence of information between each device, the play area appears in a stable position even if when devices move around.

Figure 17:
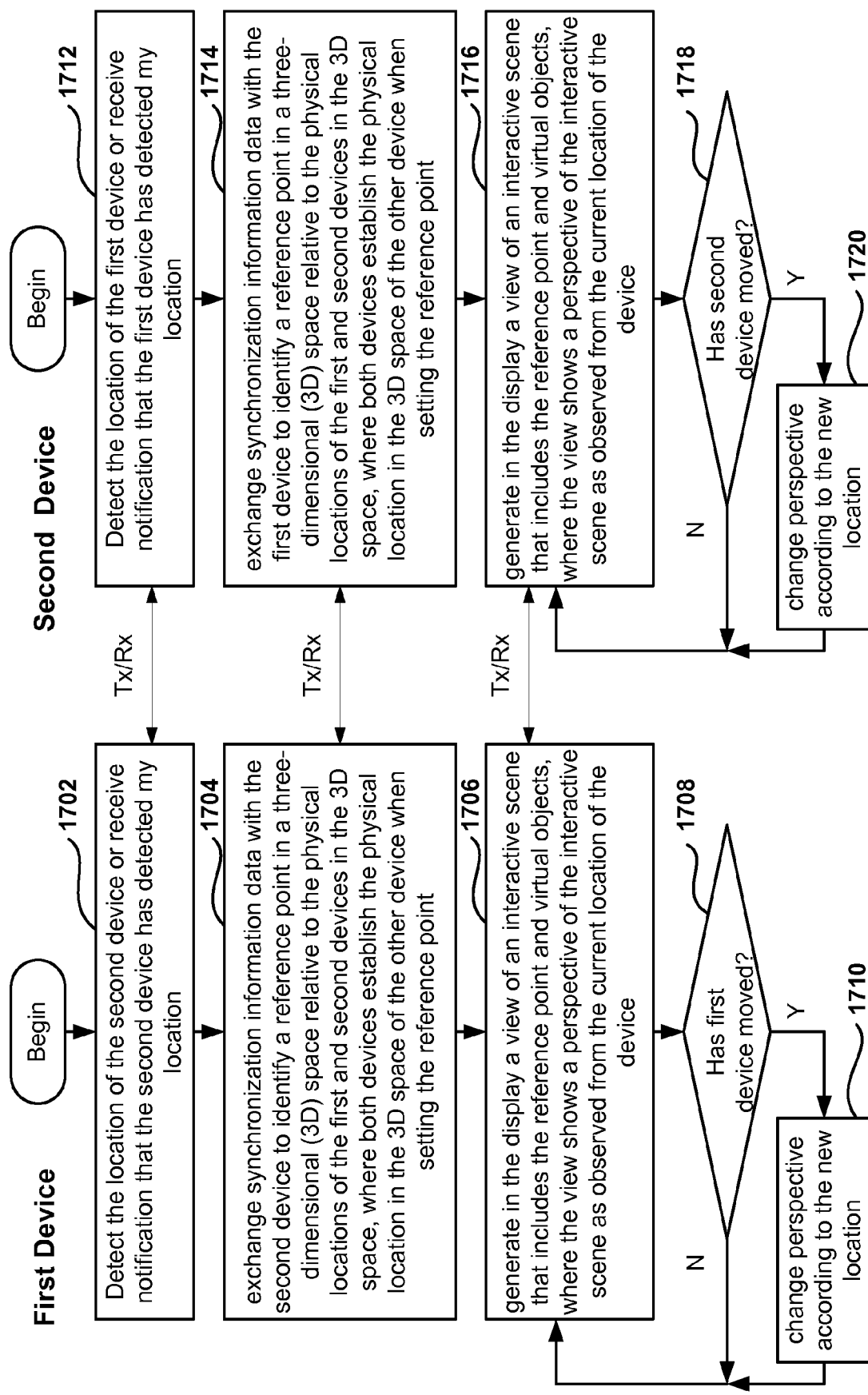
FIG. 17 shows the flow of an algorithm for generating an interactive space viewable through at least a first and a second device, in accordance with one embodiment of the invention.

FIG. 17 shows the flow of an algorithm for generating an interactive space viewable through at least a first and a second device, in accordance with one embodiment of the invention. The algorithm describes the process flows being performed on each portable device, and a separate flow is described for the first device and for the second device. In reference to the first device, the method begins with operation 702, where the location of the second device is detected or a notification is received that the second device has detected the first device. The method flows to operation 1704 where synchronization information data is exchanged with the second device in order to identify a reference point in the 3D space. The reference point is relative to the physical locations of the first and second devices in the 3D space. Additionally, both devices establish the physical location in the 3D space of the other device when setting the reference point.

From operation 1704, the method flows to operation 1706 for generating in the display a view of an interactive scene that includes the reference point and one or more virtual objects. The view shows the perspective of the interactive scene as observed from the current location of the device. After the view is shown in the display, a check is performed in operation 1708 to determine if the first device has moved. If the first device has moved, the method flows to operation 1710 to change the perspective for the display according to the new location of the first device. If the device has not moved, the method loops back to operation 1706 to continue updating the display, such as to reflect changes of virtual objects during game play.

During operations 1702, 1704, and 1706, the first device can exchange game and position tracking information with the second device. The second device performs a similar method to the one performed by the first device in operations 1712, 1714, 1716, 1718, and 1720.

Figure 18:
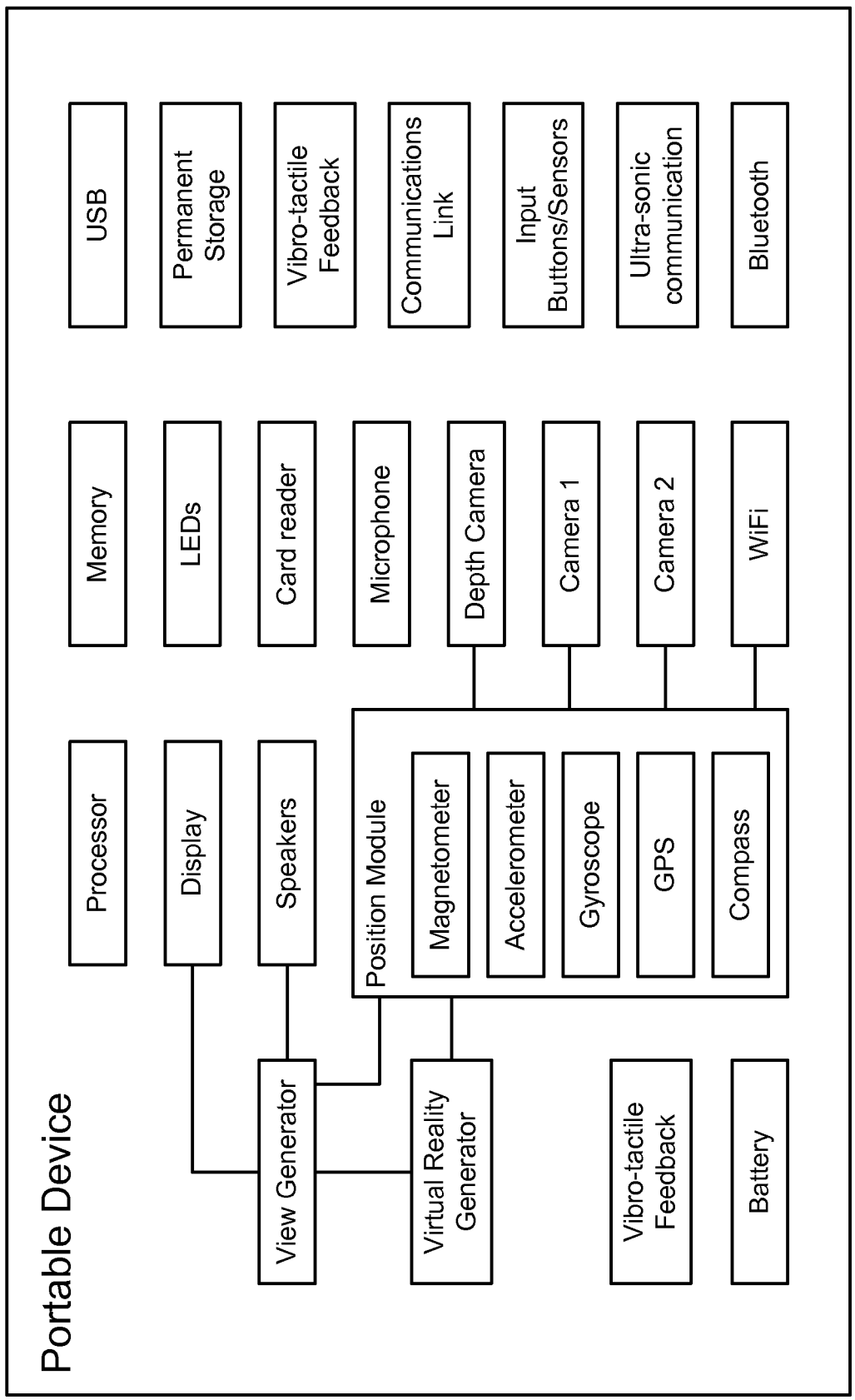
FIG. 18 illustrates the architecture of a device that may be used to implement embodiments of the invention.

FIG. 18 illustrates the architecture of a device that may be used to implement embodiments of the invention. The portable device is a computing device and include typical modules present in a computing device, such as a processor, memory (RAM, ROM, etc.), battery or other power source, and permanent storage (such as a hard disk). Communication modules allow the portable device to exchange information with other portable devices, other computers, servers, etc. The communication modules include a Universal Serial Bus (USB) connector, a communications link (such as Ethernet), ultrasonic communication, Bluetooth, and WiFi.

Input modules include input buttons and sensors, microphone, touch sensitive screen, cameras (front facing, rear facing, depth camera), and card reader. Other input/output devices, such as a keyboard or a mouse, can also be connected to the portable device via communications link, such as USB or Bluetooth. Output modules include a display (with a touch-sensitive screen), Light-Emitting Diodes (LED), vibro-tactile feedback, and speakers. Other output devices can also connect to the portable device via the communication modules.

Information from different devices can be used by the Position Module to calculate the position of the portable device. These modules include a magnetometer, an accelerometer, a gyroscope, a GPS, and a compass. Additionally, the Position Module can analyze sound or image data captured with the cameras and the microphone to calculate the position. Further yet, the Position Module can perform tests to determine the position of the portable device or the position of other devices in the vicinity, such as WiFi ping test or ultrasound tests.

A Virtual Reality Generator creates the virtual or augmented reality, as previously described, using the position calculated by the Position Module. A view generator creates the view that is shown on the display, based on the virtual reality and the position. The view generator can also produce sounds originated by the Virtual Reality Generator, using directional effects that are applied to a multi-speaker system.

It should be appreciated that the embodiment illustrated in FIG. 18 is an exemplary implementation of a portable device. Other embodiments may utilize different modules, a subset of the modules, or assign related tasks to different modules. The embodiment illustrated in FIG. 18 should therefore not be interpreted to be exclusive or limiting, but rather exemplary or illustrative.

Figure 19:
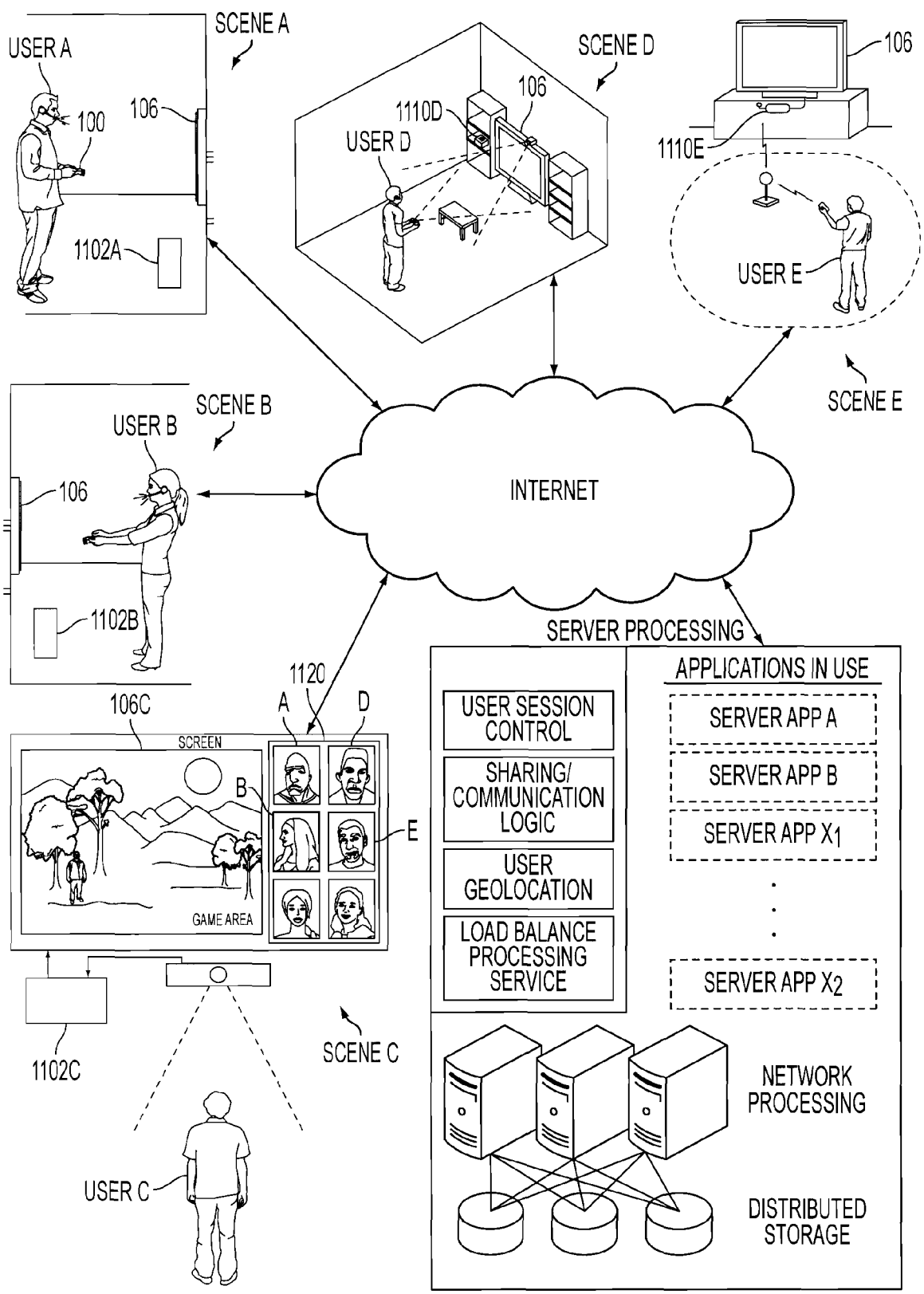
FIG. 19 is an exemplary illustration of scene A through scene E with respective user A through user E interacting with game clients 1102 that are connected to server processing via the internet, in accordance with one embodiment of the present invention.

FIG. 19 is an exemplary illustration of scene A through scene E with respective user A through user E interacting with game clients 1102 that are connected to server processing via the internet, in accordance with one embodiment of the present invention. A game client is a device that allows users to connect to server applications and processing via the internet. The game client allows users to access and playback online entertainment content such as but not limited to games, movies, music and photos. Additionally, the game client can provide access to online communications applications such as VOIP, text chat protocols, and email.

A user interacts with the game client via controller. In some embodiments the controller is a game client specific controller while in other embodiments, the controller can be a keyboard and mouse combination. In one embodiment, the game client is a standalone device capable of outputting audio and video signals to create a multimedia environment through a monitor/television and associated audio equipment. For example, the game client can be, but is not limited to a thin client, an internal PCI-express card, an external PCI-express device, an ExpressCard device, an internal, external, or wireless USB device, or a Firewire device, etc. In other embodiments, the game client is integrated with a television or other multimedia device such as a DVR, Blu-Ray player, DVD player or multi-channel receiver.

Within scene A of FIG. 19, user A interacts with a client application displayed on a monitor 106 using a controller 100 paired with game client 1102A. Similarly, within scene B, user B interacts with another client application that is displayed on monitor 106 using a controller 100 paired with game client 1102B. Scene C illustrates a view from behind user C as he looks at a monitor displaying a game and buddy list from the game client 1102C. While FIG. 19 shows a single server processing module, in one embodiment, there are multiple server processing modules throughout the world. Each server processing module includes sub-modules for user session control, sharing/communication logic, user geo-location, and load balance processing service. Furthermore, a server processing module includes network processing and distributed storage.

When a game client 1102 connects to a server processing module, user session control may be used to authenticate the user. An authenticated user can have associated virtualized distributed storage and virtualized network processing. Examples items that can be stored as part of a user's virtualized distributed storage include purchased media such as, but not limited to games, videos and music etc. Additionally, distributed storage can be used to save game status for multiple games, customized settings for individual games, and general settings for the game client. In one embodiment, the user geo-location module of the server processing is used to determine the geographic location of a user and their respective game client. The user's geographic location can be used by both the sharing/communication logic and the load balance processing service to optimize performance based on geographic location and processing demands of multiple server processing modules. Virtualizing either or both network processing and network storage would allow processing tasks from game clients to be dynamically shifted to underutilized server processing module(s). Thus, load balancing can be used to minimize latency associated with both recall from storage and with data transmission between server processing modules and game clients.

The server processing module has instances of server application A and server application B. The server processing module is able to support multiple server applications as indicated by server application $X_1$ and server application $X_2$. In one embodiment, server processing is based on cluster computing architecture that allows multiple processors within a cluster to process server applications. In another embodiment, a different type of multi-computer processing scheme is applied to process the server applications. This allows the server processing to be scaled in order to accommodate a larger number of game clients executing multiple client applications and corresponding server applications. Alternatively, server processing can be scaled to accommodate increased computing demands necessitated by more demanding graphics processing or game, video compression, or application complexity. In one embodiment, the server processing module performs the majority of the processing via the server application. This allows relatively expensive components such as graphics processors, RAM, and general processors to be centrally located and reduces to the cost of the game client. Processed server application data is sent back to the corresponding game client via the internet to be displayed on a monitor.

Scene C illustrates an exemplary application that can be executed by the game client and server processing module. For example, in one embodiment game client 1102C allows user C to create and view a buddy list 1120 that includes user A, user B, user D and user E. As shown, in scene C, user C is able to see either real time images or avatars of the respective user on monitor 106C. Server processing executes the respective applications of game client 1102C and with the respective game clients 1102 of users A, user B, user D and user E.

Because the server processing is aware of the applications being executed by game client B, the buddy list for user A can indicate which game user B is playing. Further still, in one embodiment, user A can view actual in game video directly from user B. This is enabled by merely sending processed server application data for user B to game client A in addition to game client B.

In addition to being able to view video from buddies, the communication application can allow real-time communications between buddies. As applied to the previous example, this allows user A to provide encouragement or hints while watching real-time video of user B. In one embodiment two-way real time voice communication is established through a client/server application. In another embodiment, a client/server application enables text chat. In still another embodiment, a client/server application converts speech to text for display on a buddy's screen.

Scene D and scene E illustrate respective user D and user E interacting with game consoles 1110D and 1110E respectively. Each game console 1110D and 1110E are connected to the server processing module and illustrate a network where the server processing modules coordinates game play for both game consoles and game clients.

Figure 20:
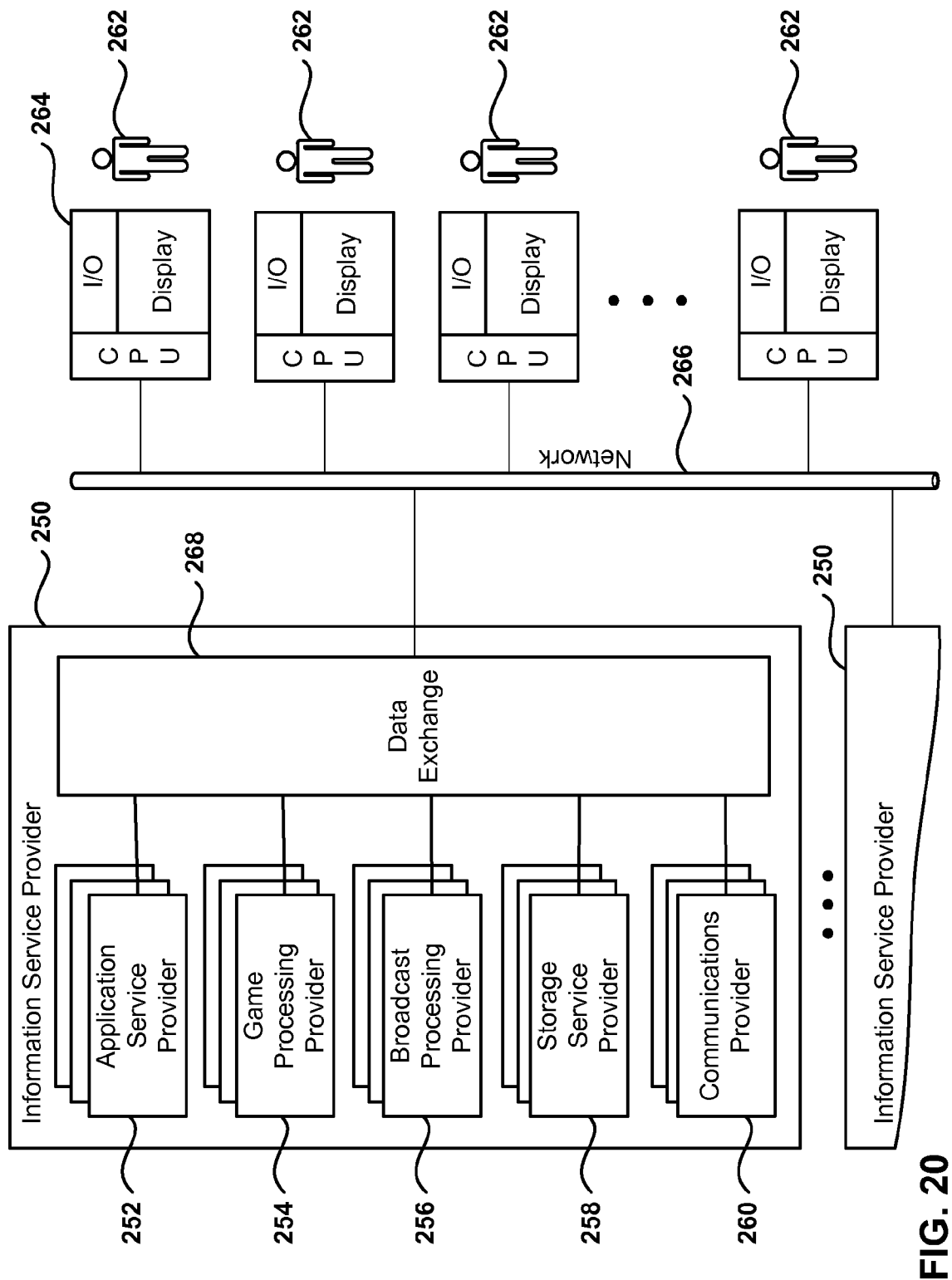
FIG. 20 illustrates an embodiment of an Information Service Provider architecture.

FIG. 20 illustrates an embodiment of an Information Service Provider architecture. Information Service Providers (ISP) 250 delivers a multitude of information services to users 262 geographically dispersed and connected via network 266. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In other embodiment, the data is transferred from one ISP to another ISP as the client moves around the world to make the ISP in better position to service the user be the one that delivers these services.

ISP 250 includes Application Service Provider (ASP) 252, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet, based on how the Internet is depicted in computer network diagrams and is an abstraction for the complex infrastructure it conceals.

Further, ISP 250 includes a Game Processing Server (GPS) 254 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 256 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 258 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 260 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 268 interconnects the several modules inside ISP 253 and connects these modules to users 262 via network 266. Data Exchange 268 can cover a small area where all the modules of ISP 250 are in close proximity, or can cover a large geographic area when the different modules are geographically dispersed. For example, Data Exchange 268 can include a fast Gigabit Ethernet (or faster) within a cabinet of a data center, or an intercontinental virtual area network (VLAN).

Users 262 access the remote services with client device 264, which includes at least a CPU, a display and I/O. The client device can be a PC, a mobile phone, a netbook, a PDA, etc. In one embodiment, ISP 250 recognizes the type of device used by the client and adjusts the communication method employed. In other cases, client devices use a standard communications method, such as html, to access ISP 250.

Information Service Providers (ISP) 250 delivers a multitude of information services to users 262 geographically dispersed and connected via network 266. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In other embodiment, the data is transferred from one ISP to another ISP as the client moves around the world to make the ISP in better position to service the user be the one that delivers these services.

ISP 250 includes Application Service Provider (ASP) 252, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet, based on how the Internet is depicted in computer network diagrams and is an abstraction for the complex infrastructure it conceals.

Further, ISP 250 includes a Game Processing Server (GPS) 254 which is used by game clients to play single and multi-player video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multi-player games. Massively multiplayer online games run on dedicated servers usually hosted by the software company that owns the game title, allowing them to control and update content.

Broadcast Processing Server (BPS) 256 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 258 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 260 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 268 interconnects the several modules inside ISP 253 and connects these modules to users 262 via network 266. Data Exchange 268 can cover a small area where all the modules of ISP 250 are in close proximity, or can cover a large geographic area when the different modules are geographically dispersed. For example, Data Exchange 268 can include a fast Gigabit Ethernet (or faster) within a cabinet of a data center, or an intercontinental virtual area network (VLAN).

Users 262 access the remote services with client device 264, which includes at least a CPU, a display and I/O. The client device can be a PC, a mobile phone, a netbook, a PDA, etc. In one embodiment, ISP 250 recognizes the type of device used by the client and adjusts the communication method employed. In other cases, client devices use a standard communications method, such as html, to access ISP 250.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

One or more embodiments of the present invention can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for generating an interactive space viewable through at least a first and a second device, the method comprising:
    detecting from the first device a location of the second device or detecting from the second device a location of the first device, wherein the first device and the second device are handheld devices;
    exchanging synchronization information data between the first and second devices to identify a reference point in a three-dimensional (3D) space relative to a physical location of the first and second devices in the 3D space, wherein the first and second devices establish the physical location in the 3D space of the other device when setting the reference point; and
    generating views of an interactive scene in corresponding displays of the first and second devices, wherein the corresponding device acts as a camera viewing into the interactive scene, the interactive scene is tied to the reference point and includes virtual objects, each view showing all or part of the interactive scene and showing the interactive scene as observed from a current location of the corresponding device with a viewing angle of the corresponding camera, wherein device movement in the 3D space causes the corresponding view to change according to the current location and the viewing angle.

2. The method as recited in claim 1, wherein detecting from the first device the location of the second device further includes:
    detecting that the first device has tapped a first object at a first time;
    receiving information that the second device has tapped a second object at a second time; and
    determining that the first device has tapped the second device when the first and the second times are substantially simultaneous.

3. The method as recited in claim 1, wherein detecting from the first device the location of the second device further includes:
    recognizing the second device in an image taken with a camera in the first device.

4. The method as recited in claim 1, wherein detecting from the first device the location of the second device further includes:
    detecting a light source in the second device in an image taken with a camera in the first device.

5. The method as recited in claim 1, wherein detecting from the first device the location of the second device further includes:
  detecting a distance between the first device and the second using a depth camera.

6. The method as recited in claim 1, wherein detecting from the first device the location of the second device further includes:
  recognizing a display of the second device in an image taken with a camera in the first device.

7. The method as recited in claim 1, wherein detecting from the first device the location of the second device further includes:
  recognizing a pattern in the display of the second device in an image taken with a camera in the first device.

8. The method as recited in claim 1, further including:
  tracking motion of the first device by the first device, wherein tracking motion of the first device further includes using dead reckoning to determine the current location of the first device.

9. The method as recited in claim 8, wherein tracking motion of the first device further includes:
  tracking location of static features in the 3D space using image information; and
  correcting shift in dead reckoning based on the location of the static features.

10. The method as recited in claim 9, wherein the static features are selected from a group consisting of an edge of a table, a corner in a room, a window, or a television set.

11. The method as recited in claim 1, further including:
  resetting location tracking modules in the first device and the second device when the reference point is identified.

12. The method as recited in claim 1, wherein the viewing angle is defined as a vector with origin in a center of the display and with a direction perpendicular to and away from the display.

13. A method for generating an interactive space viewable through at least a first and a second device, the method comprising:
  detecting a tapping between the first device and the second device, wherein the first device and the second device are handheld devices;
  exchanging synchronization information data between the first and second devices to identify a reference point in a three-dimensional (3D) space relative to a physical location of the first and second devices in the 3D space when the tapping was detected; and
  generating views of an interactive scene in corresponding displays of the first and second devices, wherein the corresponding device acts as camera viewing into the interactive scene, the interactive scene is tied to the reference point and includes virtual objects, each view showing all or part of the interactive scene and showing the interactive scene as observed from a current location of the corresponding device with a viewing angle of the corresponding camera, wherein device movement in the 3D space causes the corresponding view to change according to the current location and the viewing angle.

14. The method as recited in claim 13, wherein detecting the tapping further includes:
  detecting that the first device has tapped a first object at a first time;
  receiving information that the second device has tapped a second object at a second time; and
  determining that the first device has tapped the second device when the first and the second times are substantially simultaneous.

15. The method as recited in claim 14, wherein detecting that a first device has tapped a first object further includes:
  identifying an abrupt change in motion of the first device.

16. The method as recited in claim 15, wherein identifying the abrupt change is based on information from a 3-axis accelerometer.

17. The method as recited in claim 13, wherein each device is configured for interaction with the virtual objects.

18. A portable handheld device for sharing a virtual reality among portable handheld devices, the portable handheld device comprising:
  a position module for tracking a position of the portable handheld device, the position module configured to detect a location of a second device in reference to a location of the portable handheld device;
  a communications module for exchanging synchronization information data between the portable handheld device and the second device, wherein a reference point in a three-dimensional (3D) space relative to a physical location of the portable handheld device in the 3D space is identified based on the synchronization information;
  a view generator that creates a view of an interactive scene that is tied to the reference point and includes virtual objects, wherein the portable handheld device acts as camera viewing into the interactive scene, the view showing all or part of the interactive scene as observed from a current location of the portable handheld device with a viewing angle of the camera, wherein portable handheld device movement in the 3D space causes the view to change according to the current location and the viewing angle; and
  a display for showing the view.

19. The portable handheld device of claim 18, wherein the position module includes location tracking modules, wherein the location tracking modules further include:
  a 3-axis accelerometer;
  a 3 axis gyroscope;
  a camera;
  a GPS module; and
  a depth camera.

20. The portable handheld device of claim 18, wherein detecting the location of the second device further includes:
  detecting that the portable handheld device has tapped a first object at a first time;
  receiving information that the second device has tapped a second object at a second time; and
  determining that the portable handheld device has tapped the second device when the first and the second times are substantially simultaneous.

* * * * *